(12) United States Patent  
Ohtsuka et al.

(10) Patent No.: US 12,492,154 B2
(45) Date of Patent: Dec. 9, 2025

(54) METHOD FOR PRODUCING FUEL GAS

(71) Applicant: Osaka Gas Co., Ltd., Osaka (JP)

(72) Inventors: Hirofumi Ohtsuka, Osaka (JP); Shimpei Norioka, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 651 days.

(21) Appl. No.: 17/909,176

(22) PCT Filed: Feb. 9, 2021

(86) PCT No.: PCT/JP2021/004807
§ 371 (c)(1),
(2) Date: Sep. 2, 2022

(87) PCT Pub. No.: WO2021/176970
PCT Pub. Date: Sep. 10, 2021

(65) Prior Publication Data
US 2023/0093127 A1 Mar. 23, 2023

(30) Foreign Application Priority Data

Mar. 4, 2020 (JP) .................................. 2020-036636
Mar. 4, 2020 (JP) .................................. 2020-036637
(Continued)

(51) Int. Cl.
*C07C 1/04* (2006.01)
*B01J 23/44* (2006.01)
(Continued)

(52) U.S. Cl.
CPC ................. *C07C 1/04* (2013.01); *B01J 23/44* (2013.01); *C07C 9/04* (2013.01); *C10K 3/04* (2013.01); *C10L 3/08* (2013.01)

(58) Field of Classification Search
CPC ..... C07C 1/12; C07C 9/04; C07C 1/04; B01J 23/44; C10L 3/08; C10L 3/101
See application file for complete search history.

(56) References Cited

U.S. PATENT DOCUMENTS

2017/0022121 A1   1/2017   Abbott

FOREIGN PATENT DOCUMENTS

JP       60235893 A     11/1985
JP       20149166 A      1/2014
(Continued)

OTHER PUBLICATIONS

Binran, Catalysis Handbook, edited by Catalysis Society of Japan, 2008, p. 535.
(Continued)

*Primary Examiner* — Jafar F Parsa
(74) *Attorney, Agent, or Firm* — The Webb Law Firm

(57) ABSTRACT

Provided is a first step of causing hydrogen and carbon oxide to react with each other in a presence of a first catalyst to obtain a first fuel gas 2 that contains 2% to 10% hydrogen by volume after dehydration; and a second step of consuming the hydrogen in the first fuel gas 2 to obtain a second fuel gas 4 with a reduced hydrogen concentration. The first catalyst includes a methanation catalyst. The second step includes an exothermic reaction that generates heat of 60 kJ or more per mole of hydrogen, and the exothermic reaction is a reaction through which the hydrogen in the first fuel gas 2 and a predetermined reactant 3 are caused to react with each other in a presence of a second catalyst to generate water or a paraffin hydrocarbon with two to four carbon atoms.

7 Claims, 9 Drawing Sheets

(30) Foreign Application Priority Data

Nov. 6, 2020 (JP) .................................. 2020-185726
Dec. 10, 2020 (JP) .................................. 2020-205082
Feb. 3, 2021 (JP) .................................. 2021-015713

(51) Int. Cl.
*C07C 9/04* (2006.01)
*C10K 3/04* (2006.01)
*C10L 3/08* (2006.01)

(56) References Cited

FOREIGN PATENT DOCUMENTS

| | | | |
|---|---|---|---|
| JP | 201525048 | A | 2/2015 |
| JP | 2015124217 | A | 7/2015 |
| JP | 2018135283 | A | 8/2018 |
| JP | 201926595 | A | 2/2019 |

OTHER PUBLICATIONS

Kawagoshi et al., Development of Coke Oven Gas-SNG Process, Hitachi Review, 1986, vol. 68, No. 10, p. 73.
Koytsoumpa et al., Equilibrium and kinetic aspects for catalytic methanation focusing on $CO_2$ derived Substitute Natural Gas (SNG), Renewable and Sustainable Energy Reviews, 2018, vol. 94, pp. 536-550.
Osaka Gas Co., Ltd., Biogas Purchasing Guidelines, Apr. 1, 2008.
Syusei, De-Co process, edited by The Society for Chemical Engineers, 1970, Japan, p. 153.
Tokyo Gas Co., Ltd., Biogas Purchasing Guidelines, Apr. 1, 2008.

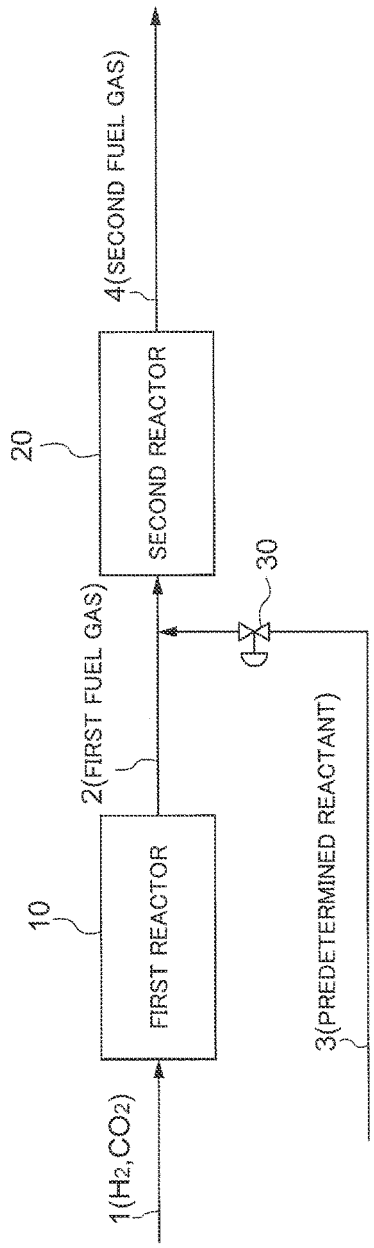

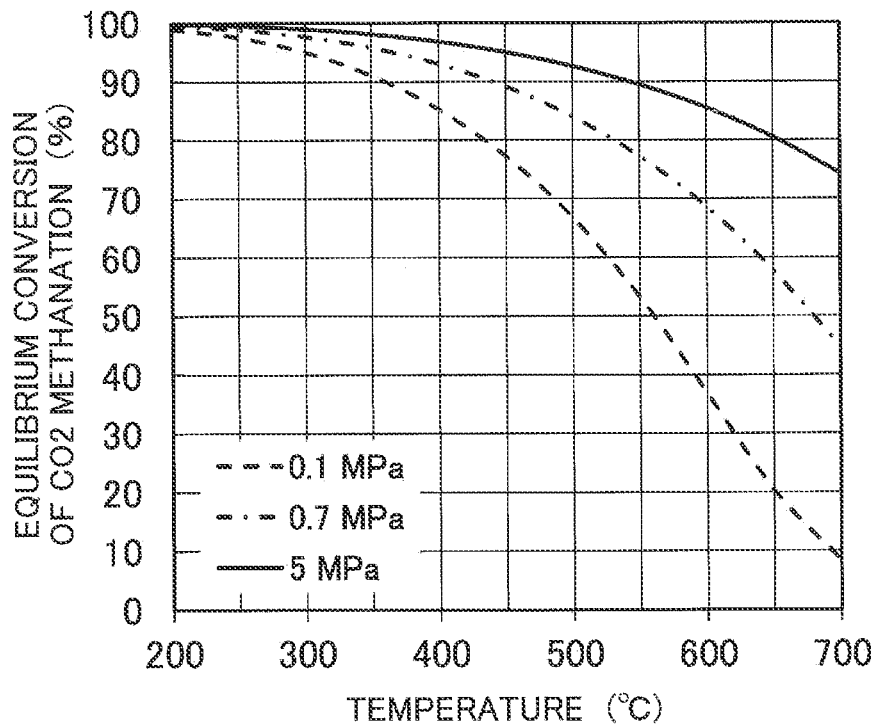
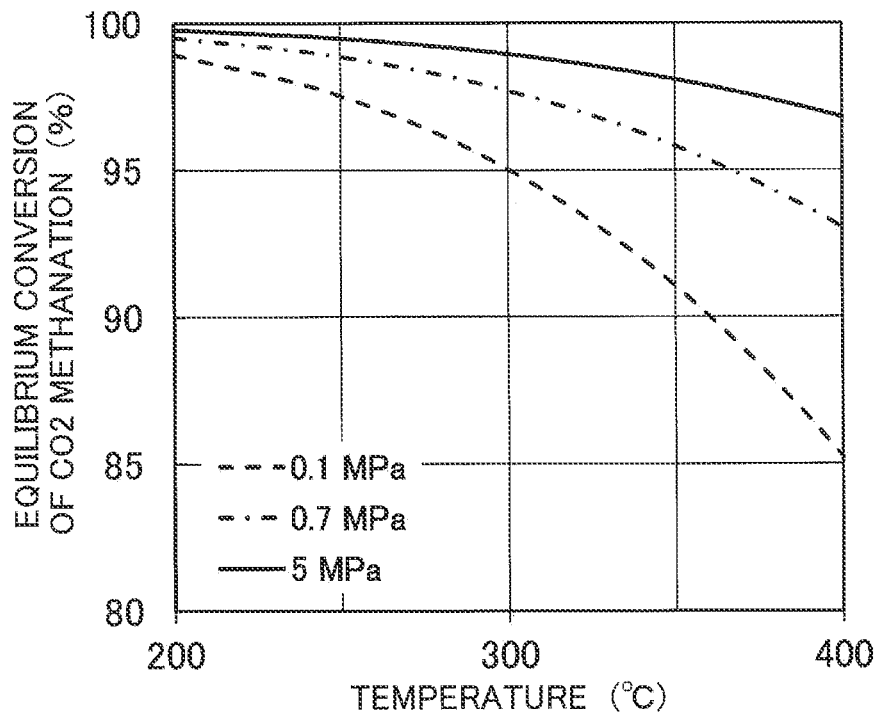

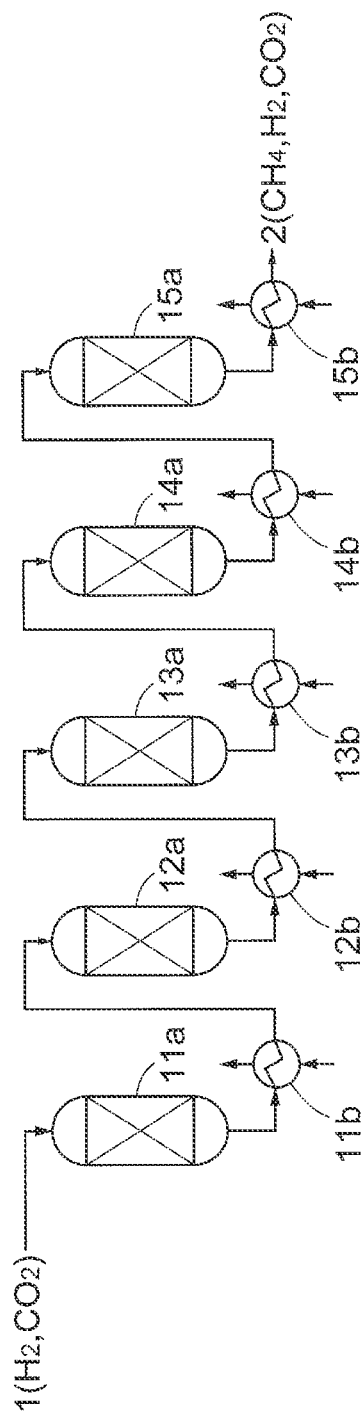

METHOD FOR PRODUCING FUEL GAS

CROSS-REFERENCE TO RELATED APPLICATIONS

This application is the United States national phase of International Application No. PCT/JP2021/004807 filed Feb. 9, 2021, and claims priority to Japanese Patent Application Nos. 2020-036636 filed Mar. 4, 2020, 2020-036637 filed Mar. 4, 2020, 2020-185726 filed Nov. 6, 2020, 2020-205082 filed Dec. 10, 2020, and 2021-015713 filed Feb. 3, 2021, the disclosures of which are hereby incorporated by reference in their entirety.

BACKGROUND OF THE INVENTION

Field of the Invention

The present invention relates to a method for producing fuel gas that contains methane as the main component thereof and has a high calorific value by subjecting hydrogen and carbon oxide to methanation reaction in the presence of a methanation catalyst, and more specifically to a method for producing fuel gas with reduced hydrogen concentration and high hydrocarbon concentration.

Description of Related Art

In recent years, from the viewpoint of global warming countermeasures, attention has been focused on carbon-neutral fuels that do not substantially increase the concentration of carbon dioxide in the atmosphere when used for combustion.

Methane can be obtained by collecting carbon dioxide from an exhaust gas generated through an industrial process or thermal power generation, and causing the carbon dioxide to react with hydrogen obtained through electrolysis that employs electricity generated with renewable energy through solar power generation, wind power generation, or the like. Methane obtained through such a method can be considered as carbon-neutral fuel that does not affect global warming because it does not generate an additional carbon dioxide when used for combustion.

The methanation reaction (Formula 1), through which carbon dioxide reacts with hydrogen to yield methane, is well known.

$$CO_2 + 4H_2 \rightarrow CH_4 + 2H_2O \quad \text{(Formula 1)}$$

Patent Document 1 discloses a method for methanizing gas that contains CO and $H_2$, characterized in that a methanation reactor in which a Cu—Zn-based low-temperature shift catalyst is disposed on the upstream side and a methanation catalyst is disposed on the downstream side is used to methanize the gas that contains CO and $H_2$. It is envisaged that the CO shift reaction (Formula 2) proceeds in the low temperature shift reactor on the upstream side, and therefore the most of the carbon monoxide contained in the raw material gas reacts with water vapor and is converted into carbon dioxide, and the methanation reaction of the carbon dioxide proceeds on the methanation catalyst on the downstream side.

$$CO + H_2O \rightarrow CO_2 + H_2 \quad \text{(Formula 2)}$$

The methanation reaction has been used for a long time to remove carbon monoxide and carbon dioxide from hydrogen for ammonia synthesis, and it is known that catalysts that support Ni, Ru, or the like show high activity (Non-Patent Documents 1 and 2).

The methanation reaction through which carbon oxides (a carbon monoxide and a carbon dioxide) are caused to react with hydrogen to obtain methane is an industrially established technique (for example, Non-Patent Document 3). However, there are still problems with obtaining quality fuel gas that can be used as a raw material for city gas.

Natural gas is commonly used as a raw material for city gas, and contains methane, which is the main component thereof, and a small amount of ethane, propane, and butane. Natural gas typically does not contain hydrogen or carbon monoxide, and carbon dioxide is removed in the process of refining natural gas. In particular, city gas produced from liquefied natural gas is substantially free of hydrogen, carbon monoxide, or carbon dioxide as they are completely removed in the process of liquefaction and refining.

The concentration of hydrocarbons (ethane, propane, and butane) other than methane contained in natural gas varies depending on the place of origin of the natural gas, and the purification method. Therefore, when city gas is to be produced, typically propane or butane is added in order to adjust the amount of heat so as to fall within a certain range, an odorant is added in order to ensure safety, and thereafter the gas is sent to customers via city gas conduits.

If hydrogen, carbon monoxide, or carbon dioxide is contained in city gas, the following problems may be caused.

First, carbon monoxide is highly toxic, and may cause a poisoning accident if the gas leaks. The allowable concentration thereof is 200 ppm, and from a safety perspective, the concentration in the fuel gas is desirably no higher than this level, and is required to be no higher than 1000 ppm even if dilution with air is taken into account.

Second, carbon dioxide is not only nonflammable, but also has the function of suppressing combustion. Therefore, when carbon dioxide is mixed into the fuel gas at a high concentration, not only the efficiency of gas transportation through conduits may decrease due to a decrease in the calorific value of the fuel gas, but also the efficiency of the combustion equipment may decrease.

Finally, hydrogen is a fuel gas, but the calorific value per unit volume thereof is only approximately one-third that of methane, which is the main component of city gas. Therefore, if hydrogen is mixed into fuel gas that contains methane as the main component thereof, the calorific value per unit volume thereof decreases. Furthermore, it is known that hydrogen has a large effect on combustion equipment because of the high combustion rate thereof.

As described above, if hydrogen, carbon monoxide, or carbon dioxide is mixed into city gas, they have various effects at each stage of gas supply and consumption, and therefore quality criteria for the gas to be fed to a city gas conduit network generally impose restrictions on the concentrations of hydrogen, carbon monoxide and carbon dioxide.

Regarding a conduit network in which fuel filling stations for natural gas vehicles are provided, there is a known example in which the upper limit of the hydrogen concentration is 2% by volume (Non-Patent Document 4). In addition, an example in which the hydrogen concentration is restricted to 4% or less by volume, the carbon dioxide concentration is restricted to 0.5% or less by volume, and the carbon monoxide concentration is restricted to 0.05% or less by volume (Non-Patent Document 5), and an example in which the total concentration of methane and ethane is restricted to 93% or more by volume, and the total concentration of components other than hydrocarbons is restricted to 4% or less by volume (Non-Patent Document 6) are also known.

Regarding the contamination of hydrogen, carbon monoxide, and carbon dioxide, there are also problems from perspectives other than the quality of city gas. City gas is supplied after being adjusted so as to fall within a certain calorific value range by adding propane or butane thereto as described above so that it can be stably used in combustion equipment. Therefore, if hydrogen or carbon dioxide is contained in the gas in high concentration, it is necessary to mix a large amount of propane, butane, or the like into the gas to adjust the calorific value of the gas. This not only increases the cost of gas production, but also impairs the carbon neutrality of the produced gas when propane or butane derived from fossil fuels is used to adjust the calorific value.

The carbon dioxide methanation reaction (Formula 1) is an equilibrium reaction, and carbon dioxide and hydrogen cannot be completely converted to methane under normal industrial operating conditions. The equilibrium conversion of the carbon dioxide methanation in a case where a mixed gas in which the stoichiometric ratio between hydrogen and carbon dioxide is 4:1 is caused to react at ambient pressure (0.1 MPa) is 95.0% when the reaction temperature is 300° C., 97.5% when the reaction temperature is 250° C., and 98.9% when the reaction temperature is 200° C.

In this way, at normal pressure, it is only possible to obtain a fuel gas that contains a large amount of hydrogen. The methanation reaction is an exothermic reaction, and therefore the equilibrium conversion improves as the temperature decreases. However, in the case of the catalytic reaction, the catalytic activity decreases as the temperature decreases. Therefore, the reaction temperature has a lower limit, and in the case of a normal methanation catalyst, the reaction temperature is required to be no lower than 250° C. in order to obtain a practical reaction rate (Non-Patent Document 4 and Patent Documents 2 and 3).

The carbon dioxide methanation reaction (Formula 1) is a reaction in which the amount of substance (the number of moles) decreases, and therefore the higher the pressure is, the higher the equilibrium conversion is. When compared at 250° C., the equilibrium conversion of the carbon dioxide methanation (when gas in which the ratio of the hydrogen to the carbon dioxide, which is the stoichiometric ratio, is 4:1 is caused to react) is 97.5% at normal pressure (0.1 MPa), and improves to 98.9% at 0.7 MPa, and to 99.5% at 5 MPa. However, even when mixed gas in which hydrogen:carbon dioxide is 4:1 is caused to react at 250° C. and 5 MPa, the equilibrium composition (volume-based composition after dehydration removing the generated water) contains 97.45% methane, 2.04% hydrogen, and 0.51% carbon dioxide. Therefore, in order to obtain fuel gas that contains 2% or less hydrogen (by volume), it is necessary to cause the reaction under high pressure conditions at a pressure higher than 5 MPa.

There are several known methods for reducing the hydrogen concentration in fuel gas obtained through the methanation reaction. For example, if the methanation reaction is caused under conditions where the amount of hydrogen is smaller compared to the stoichiometric ratio, and the excess carbon dioxide is removed through decarboxylation treatment, both the hydrogen content and the carbon dioxide content can be reduced (Patent Document 4). This method has been adopted in an example of methanation of coke oven gas (Non-Patent Document 3). However, decarboxylation facilities generally require high facility costs and consume a large amount of energy for operation, and therefore there is a problem in that economic efficiency is impaired.

Another known method is to cause the methanation reaction in a plurality of stages, and cool the gas generated in an intermediate stage to condense and separate water (Non-Patent Document 4 and Patent Documents 2 and 3). By removing the generated water, the methanation reaction can be further advanced forward to the generation side, and the conversion of the carbon dioxide methanation can be improved. However, this method requires a heat exchange facility, which increases facility costs, and also complicates control of the water separation process because excessive removal of the generated water will bring the composition of the gas into a zone where carbon deposition occurs in equilibrium.

Furthermore, in both the case of the method of causing the methanation reaction under conditions where the amount of hydrogen is smaller compared to the stoichiometric ratio, and removing the excess carbon dioxide through decarboxylation treatment, and the case of the method of causing the methanation reaction in a plurality of stages, and cooling the gas generated in an intermediate stage to condense and separate water, there is a problem in that the concentration of carbon monoxide contained in the produced fuel gas will be high because the conditions are such that carbon monoxide is readily generated in equilibrium.

Patent Documents

Patent Document 1: JPS60-235893A
Patent Document 2: JP2015-124217A
Patent Document 3: JP2018-135283A
Patent Document 4: JP2019-26595A Non-Patent Documents Non-Patent Document 1: Kagaku Purosesu Syusei, edited by The Society for Chemical Engineers, Japan, 1970, p. 153
Non-Patent Document 2: Shokubai Binran, edited by Catalysis Society of Japan, 2008, p. 535
Non-Patent Document 3: Kawagoe, Matsuda, Matsushima, and Uematsu, Hitachi Review, Vol. 68, No. 10, 1986, p. 73
Non-Patent Document 4: E. I. Koytsoumpa and S. Karellas, Renewable and Sustainable Energy Reviews, Vol. 94, 2018, p. 536
Non-Patent Document 5: Biogas Purchasing Guidelines, Osaka Gas Co., Ltd., 2008
Non-Patent Document 6: Biogas Purchasing Guidelines, Tokyo Gas Co., Ltd., 2008

SUMMARY OF THE INVENTION

In view of the above problems, in order to produce a fuel gas that contains methane as the main component thereof by subjecting hydrogen and a carbon oxide to the methanation reaction in the presence of a methanation catalyst, the present invention aims to provide a simple and economically advantageous method for obtaining fuel gas with a reduced hydrogen concentration without requiring a reaction under extremely high pressure conditions or installation of an expensive decarboxylation facility.

A characteristic configuration of a method for producing fuel gas according to the present invention lies in: a first step of causing hydrogen and carbon oxide to react with each other in a presence of a first catalyst to obtain first fuel gas that contains 2% to 10% hydrogen by volume after dehydration; and a second step of consuming the hydrogen in the first fuel gas to obtain second fuel gas with a reduced hydrogen concentration, wherein the first catalyst includes a methanation catalyst, the second step includes an exothermic reaction that generates heat of 60 kJ or more per mole of hydrogen, and the exothermic reaction is a reaction through which the hydrogen in the first fuel gas and a predetermined reactant are caused to react with each other in a presence of a second catalyst to generate water or a paraffin hydrocarbon with two to four carbon atoms.

With this characteristic configuration, the relatively high concentration of hydrogen contained in the methane-based fuel gas (the first fuel gas), obtained through the methanation reaction (the first step) while avoiding extremely high pressure conditions, is reduced in the second step. Therefore, fuel gas (the second fuel gas) with a reduced hydrogen concentration can be obtained. Note that, in the second step, the hydrogen in the first fuel gas and a predetermined reactant are caused to react with each other in a presence of a second catalyst to generate water or a paraffin hydrocarbon with two to four carbon atoms. This reaction is an exothermic reaction that generates heat of 60 kJ or more per mole of hydrogen.

A characteristic configuration of one aspect of the fuel gas production method according to the present invention lies in that the predetermined reactant comprises at least one alcohol selected from among alcohols that each have two to four carbon atoms, and the second catalyst comprises a dehydration-hydrogenation catalyst that is active in a dehydration reaction of said at least one alcohol and a hydrogenation reaction of an olefin.

With this characteristic configuration, the relatively high concentration of hydrogen contained in the methane-based fuel gas (the first fuel gas), obtained through the methanation reaction (the first step) while avoiding extremely high pressure conditions, is converted to paraffin hydrocarbon and water vapor through a reaction with the alcohols in the second step. Therefore, fuel gas (the second fuel gas) with a reduced hydrogen concentration can be obtained. In addition, the calorific value per unit volume of the paraffin hydrocarbon with two to four carbon atoms is higher than that of methane, and therefore, when the calorific value is to be adjusted, the amount of propane or butane to be added to adjust the calorific value can be reduced. Furthermore, when a biomass-derived alcohol obtained by fermenting sugar obtained from sugar cane or corn is used as the alcohols with two to four carbon atoms, the carbon neutrality of the fuel gas is not impaired.

Another characteristic configuration of the method for producing fuel gas according to the present invention lies in that a ratio of the hydrogen to the carbon oxide to be subjected to the first step has a value with which a value of {(hydrogen)+(carbon monoxide)}/{(carbon monoxide)+(carbon dioxide)} calculated based on an amount of substance (mol) falls within a range of 4.04 to 4.08, and a molar ratio of the alcohol with two to four carbon atoms to hydrogen in the first fuel gas to be subjected to the second step obtained through the first step, is from 0.45 to 0.9.

It is possible to reduce hydrogen through a reaction with alcohol, but it is not possible to reduce carbon dioxide. Therefore, with the present characteristic configuration, hydrogen supplied to the methanation catalyst (the first catalyst) undergoes a methanation reaction under excessive conditions so as to sufficiently reduce the carbon dioxide concentration in the fuel gas (the first fuel gas) obtained through the methanation process (the first step), and excess hydrogen is treated through the reaction of alcohol in the subsequent second step. As a result, it is possible to obtain fuel gas in which the carbon dioxide concentration as well as the hydrogen concentration is reduced.

For example, when only carbon dioxide is contained as carbon oxide, if the methanation reaction is caused under conditions with excessive hydrogen where the molar ratio of the hydrogen to the carbon dioxide (hydrogen/carbon dioxide) supplied to the methanation catalyst (the first catalyst) is approximately 4.04 to 4.08, the carbon dioxide concentration in the fuel gas (the first fuel gas) obtained through the methanation process (the first step) can be sufficiently reduced.

Here, if carbon monoxide is also contained as carbon oxide in addition to carbon dioxide, it is necessary to set the amount (molar ratio) of hydrogen to carbon oxide considering the fact that 1 mol of carbon monoxide reacts with 1 mol of water vapor according to Formula 2 to generate 1 mol of hydrogen and 1 mol of carbon dioxide.

That is to say, it is possible to sufficiently reduce the carbon dioxide concentration in the fuel gas obtained through the methanation process (the first step), by causing the methanation reaction under conditions where hydrogen is excessive, i.e., the ratio of the hydrogen to the carbon oxide to be subjected to the methanation process (the first step) has a value with which a value of {(hydrogen)+(carbon monoxide)}/{(carbon monoxide)+(carbon dioxide)} calculated based on the amount of substance (mol) falls within the range of 4.04 to 4.08.

Another characteristic configuration of the method for producing fuel gas according to the present invention lies in that the second catalyst comprises a solid acid catalyst and at least either palladium or platinum, and said at least either palladium or platinum is supported by the solid acid catalyst.

With this configuration, the steam reforming reaction that generates hydrogen and carbon dioxide is suppressed while the reaction between hydrogen and alcohol proceeds at a sufficient rate. Therefore, a fuel gas with an effectively reduced hydrogen concentration can be obtained.

Another characteristic configuration of the method for producing fuel gas according to the present invention lies in that the predetermined reactant is ethanol.

With this configuration, it is possible to obtain fuel gas with a high ethane concentration.

A characteristic configuration of another aspect of the method for producing fuel gas according to the present invention lies in that the predetermined reactant comprises at least one olefin hydrocarbon selected from among olefin hydrocarbons that each have two to four carbon atoms, and the second catalyst comprises a hydrogenation catalyst.

With this characteristic configuration, the relatively high concentration of hydrogen contained in the methane-based fuel gas (the first fuel gas), obtained through the methanation reaction (the first step) while avoiding extremely high pressure conditions, is converted to paraffin hydrocarbon through a reaction with olefin hydrocarbon in the second step. Therefore, fuel gas (the second fuel gas) with a reduced hydrogen concentration can be obtained. In addition, the calorific value per unit volume of the paraffin hydrocarbon with two to four carbon atoms is higher than that of methane, and therefore, when the calorific value is to be adjusted, the amount of propane or butane to be added to adjust the calorific value can be reduced. Furthermore, when olefin hydrocarbon with two to four carbon atoms is used and a carbon-neutral methanol is used as a raw material to produce fuel gas through a method such as an MTO (methanol to olefin) process, the olefin hydrocarbon with two to four carbon atoms can also be regarded as being carbon-neutral, and therefore the carbon neutrality of the fuel gas is not impaired.

Another characteristic configuration of the method for producing fuel gas according to the present invention lies in that a ratio of the hydrogen to the carbon oxide to be subjected to the first step has a value with which a value of {(hydrogen)+(carbon monoxide)}/{(carbon monoxide)+(carbon dioxide)} calculated based on an amount of substance (mol) falls within a range of 4.04 to 4.08, and a molar ratio of the olefin hydrocarbon with two to four carbon atoms to the hydrogen in the first fuel gas to be subjected to the second step obtained through the first step, is from 0.5 to 0.9.

It is possible to reduce hydrogen through a reaction with olefin, but it is not possible to reduce carbon dioxide. Therefore, with the present characteristic configuration, hydrogen supplied to the methanation catalyst (the first catalyst) undergoes a methanation reaction under excessive conditions so as to sufficiently reduce the carbon dioxide concentration in the fuel gas (the first fuel gas) obtained through the methanation process (the first step), and excess hydrogen is treated through the reaction with olefin in the subsequent second step. As a result, it is possible to obtain fuel gas (the second fuel gas) in which the carbon dioxide concentration as well as the hydrogen concentration is reduced.

For example, when only carbon dioxide is contained as a carbon oxide, if the methanation reaction is caused under conditions with excessive hydrogen where the molar ratio of the hydrogen to the carbon dioxide (hydrogen/carbon dioxide) supplied to the methanation catalyst (the first catalyst) is approximately 4.04 to 4.08, the carbon dioxide concentration in the fuel gas (the first fuel gas) obtained through the methanation process (the first step) can be sufficiently reduced.

Here, if carbon monoxide is also contained as a carbon oxide in addition to carbon dioxide, it is necessary to set the amount (molar ratio) of hydrogen to carbon oxide considering the fact that 1 mol of carbon monoxide reacts with 1 mol of water vapor according to Formula 2 to generate 1 mol of hydrogen and 1 mol of carbon dioxide.

That is to say, it is possible to sufficiently reduce the carbon dioxide concentration in the fuel gas (the first fuel gas) obtained through the methanation process (the first step), by causing the methanation reaction under conditions where hydrogen is excessive, i.e., the ratio of the hydrogen to the carbon oxide to be subjected to the methanation process (the first step) has a value with which a value of {(hydrogen)+(carbon monoxide)}/{(carbon monoxide)+(carbon dioxide)} calculated based on the amount of substance (mol) falls within the range of 4.04 to 4.08.

Another characteristic configuration of the method for producing fuel gas according to the present invention lies in that the second catalyst comprises an inorganic oxide and at least either palladium or platinum, and said at least either palladium or platinum is supported by the inorganic oxide.

With this characteristic configuration, the steam reforming reaction that generates hydrogen and carbon dioxide is suppressed while the reaction between hydrogen and olefin proceeds at a sufficient rate. Therefore, a fuel gas (the second fuel gas) with an effectively reduced hydrogen concentration can be obtained.

A characteristic configuration of another aspect of the method for producing fuel gas according to the present invention lies in that the predetermined reactant is oxygen, and the second catalyst comprises a selective oxidation catalyst capable of selectively oxidizing hydrogen.

With this characteristic configuration, the relatively high concentration of hydrogen contained in the methane-based fuel gas (the first fuel gas), obtained through the methanation reaction (the first step) while avoiding extremely high pressure conditions, is converted to water vapor through a reaction with oxygen in the second step. Therefore, a fuel gas (the second fuel gas) with a reduced hydrogen concentration can be obtained.

Another characteristic configuration of the method for producing fuel gas according to the present invention lies in that a ratio of the hydrogen to the carbon oxide to be subjected to the first step has a value with which a value of {(hydrogen)+(carbon monoxide)}/{(carbon monoxide)+(carbon dioxide)} calculated based on an amount of substance (mol) falls within a range of 4.04 to 4.08, and a molar ratio of the oxygen to the hydrogen in the first fuel gas to be subjected to the second step, obtained through the first step, is from 0.24 to 0.45.

It is possible to reduce hydrogen through a reaction with oxygen, but it is not possible to reduce carbon dioxide. Therefore, with the present characteristic configuration, hydrogen supplied to the methanation catalyst (the first catalyst) undergoes a methanation reaction under excessive conditions so as to sufficiently reduce the carbon dioxide concentration in the fuel gas (the first fuel gas) obtained through the methanation process (the first step), and excess hydrogen is treated through the reaction with oxygen in the subsequent second step. As a result, it is possible to obtain a fuel gas (the second fuel gas) in which the carbon dioxide concentration as well as the hydrogen concentration is reduced.

For example, when only carbon dioxide is contained as carbon oxide, if the methanation reaction is caused under conditions with excessive hydrogen where the molar ratio of the hydrogen to the carbon dioxide (hydrogen/carbon dioxide) supplied to the methanation catalyst (the first catalyst) is approximately 4.04 to 4.08, the carbon dioxide concentration in the fuel gas obtained through the methanation process (the first step) can be sufficiently reduced.

Here, if carbon monoxide is also contained as carbon oxide in addition to carbon dioxide, it is necessary to set the amount (molar ratio) of the hydrogen to the carbon oxide considering the fact that 1 mol of carbon monoxide reacts with 1 mol of water vapor according to Formula 2 to generate 1 mol of hydrogen and 1 mol of carbon dioxide.

That is to say, it is possible to sufficiently reduce the carbon dioxide concentration in the fuel gas (the first fuel gas) obtained through the methanation process (the first step), by causing the methanation reaction under conditions where hydrogen is excessive, i.e., the ratio of the hydrogen to the carbon oxide to be subjected to the methanation process (the first step) has a value with which a value of {(hydrogen)+(carbon monoxide)}/{(carbon monoxide)+(carbon dioxide)} calculated based on the amount of substance (mol) falls within a range of 4.04 to 4.08.

Another characteristic configuration of the method for producing fuel gas according to the present invention lies in that wherein the second catalyst comprises an inorganic oxide and at least either palladium or platinum, and said at least either palladium or platinum is supported by the inorganic oxide.

With this configuration, the steam reforming reaction that generates hydrogen and carbon dioxide is suppressed while the reaction between hydrogen and oxygen proceeds at a sufficient rate. Therefore, a fuel gas (the second fuel gas) with an effectively reduced hydrogen concentration can be obtained.

BRIEF DESCRIPTION OF THE DRAWINGS

FIG. 1 is a block flow diagram showing a method for producing fuel gas according to the present invention.

FIG. 2 is a diagram showing the effects of temperature and pressure on the equilibrium conversion of a carbon dioxide methanation reaction.

FIG. 3 is an enlarged view of the region with an equilibrium conversion of 80 to 100% in FIG. 2.

FIG. 4 shows an example of a configuration of a reactor for the methanation reaction (a fixed-bed adiabatic multi-stage reactor).

DESCRIPTION OF THE INVENTION

Figure 5:
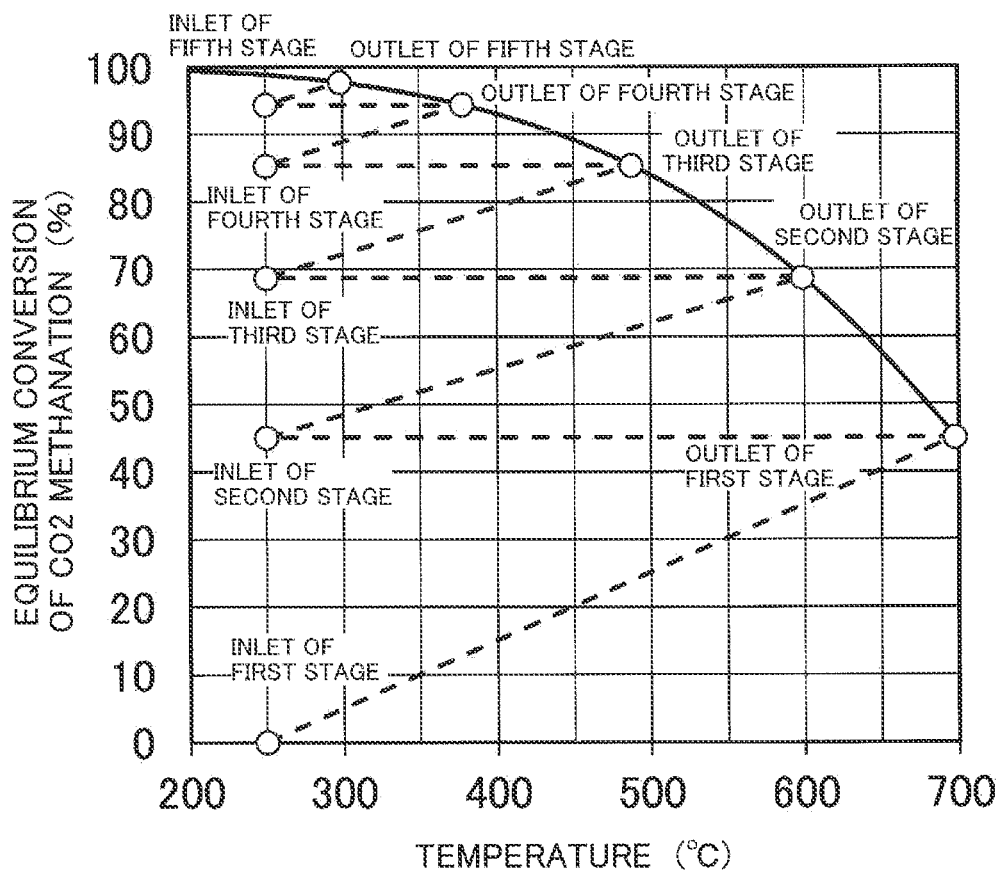
FIG. 5 is a diagram showing the conversion of the carbon dioxide methanation and the gas temperature in each reaction stage in a case where the methanation reaction is caused with the use of the fixed-bed adiabatic multi-stage reactor.

The following describes embodiments of a method for producing fuel gas according to the present invention. FIG. 1 is an example of a block flow diagram showing a fuel gas production method according to the present invention. The method for producing fuel gas according to the present embodiment includes a first step (a first reactor 10) and a second step (a second reactor 20).

Overall Configuration of Fuel Gas Production Method

In the first step, a mixed gas 1 of hydrogen and carbon oxide is brought into contact with a first catalyst filled in the first reactor 10. Here, the first catalyst includes a methanation catalyst. Therefore, the first step is a process of causing a methanation reaction. The first reactor 10 is a methanation reactor. Through this methanation reaction, a first fuel gas 2 that contains methane as the main component thereof and 2% to 10% hydrogen by volume after dehydration can be obtained.

In the second step, at first, a predetermined reactant 3 is added to the first fuel gas 2 obtained in the first step, via a flow control valve 30. Thereafter, a second fuel gas 4 with a reduced hydrogen concentration is obtained by bringing the first fuel gas 2 into contact with the reactor (the second reactor 20) filled with a second catalyst that selectively advances the reaction between the hydrogen in the first fuel gas 2 and the predetermined reactant 3. Here, the reaction between the hydrogen in the first fuel gas 2 and the predetermined reactant 3 is an exothermic reaction that generates water or a paraffin hydrocarbon with two to four carbon atoms as a product, and generates heat of 60 kJ or more per mol of hydrogen. Note that the upper limit of the calorific value of the exothermic reaction may be, for example, 250 kJ or less per mole of hydrogen.

Examples of the predetermined reactant 3 include an alcohol with two to four carbon atoms (described later as a first embodiment of the second step), an olefin hydrocarbon with two to four carbon atoms (described later as a second embodiment of the second step), and oxygen (described later as a third embodiment of the second step). As shown in Table 1, these examples react with hydrogen to provide water or a paraffin hydrocarbon with two to four carbon atoms as a product while generating heat of 60 kJ or more per mole of hydrogen. Note that the generated water is present as water vapor under the actual reaction conditions in the second step, and therefore the enthalpy change in Table 1 is represented as the value calculated assuming that the water obtained as the product is water vapor.

TABLE 1

| Reactant | | | Enthalpy Change (ΔH) (kJ/mol-H$_2$) | | |
|---|---|---|---|---|---|
| Name | Chemical Formula | Product | 25° C. | 200° C. | 300° C. |
| Oxygen | O$_2$ | 2H$_2$O | −241.8 | −243.5 | −244.4 |
| Ethylene | C$_2$H$_4$ | C$_2$H$_6$ | −136.1 | −139.0 | −140.3 |
| Propylene | C$_3$H$_6$ | C$_3$H$_8$ | −124.9 | −127.8 | −128.9 |
| 1-Butene | CH$_3$CH$_2$CH═CH$_2$ | C$_4$H$_{10}$ | −126.0 | −128.0 | −128.8 |
| 2-Butene | CH$_3$CH═CHCH$_3$ | C$_4$H$_{10}$ | −117.5 | −119.6 | −120.4 |
| 2-Methylpropen | (CH$_3$)$_2$C═CH$_2$ | (CH$_3$)$_3$CH | −117.6 | −120.0 | −120.8 |
| Ethanol | C$_2$H$_5$OH | C$_2$H$_6$ + H$_2$O | −90.7 | −92.4 | −93.5 |
| 1-Propanol | C$_3$H$_7$OH | C$_3$H$_8$ + H$_2$O | −91.4 | −92.8 | −93.6 |
| 2-Propanol | CH$_3$CH(OH)CH$_3$ | C$_3$H$_8$ + H$_2$O | −73.7 | −75.9 | −77.0 |
| 1-Butanol | C$_4$H$_9$OH | C$_4$H$_{10}$ + H$_2$O | −93.3 | −94.6 | −95.5 |
| 2-Butanol | C$_2$H$_5$CH(OH)CH$_3$ | C$_4$H$_{10}$ + H$_2$O | −75.6 | −77.3 | −78.2 |
| 2-Methyl-2-propanol | (CH$_3$)$_3$COH | (CH$_3$)$_3$CH + H$_2$O | −64.0 | −65.9 | −67.1 |
| Carbon Dioxide | CO$_2$ | CH$_4$ + 2H$_2$O | −41.2 | −43.3 | −44.3 |

The carbon dioxide methanation reaction is an exothermic reaction that generates approximately 40 kJ per mole of hydrogen. The heat of 60 kJ or more generated per mole of hydrogen is sufficiently large compared to heat that is generated through the carbon dioxide methanation. The chemical equilibrium of a reaction is determined by the Gibbs energy change (ΔG) of the reaction, and is not determined by the heat generation alone, i.e., the enthalpy change (ΔH) of the reaction. Therefore, in a strict sense, it is not accurate to discuss the state of chemical equilibrium of the reaction based on the magnitude of the enthalpy change. However, the Gibbs energy change can be expressed as ΔG=ΔH·TΔS, using the enthalpy change, temperature (T), and the entropy change (ΔS), and the latter term (TΔS) is generally smaller than the former term (ΔH). Therefore, it is possible to roughly compare the magnitude of the Gibbs energy change (ΔG) by comparing the magnitude of the enthalpy change (ΔH). Therefore, it can be said that an exothermic reaction that involves the generation of heat (enthalpy change) of 60 kJ or more per mole of hydrogen is a reaction that causes a large Gibbs energy change, and the chemical equilibrium is biased toward the generation side, and the reaction advances until the hydrogen concentration is low. Therefore, the hydrogen concentration is reduced as a result of the reaction with a reactant that provides either water or a paraffin hydrocarbon with two to four carbon atoms as a product while generating heat of 60 kJ or more per mole of hydrogen. Of water and a paraffin hydrocarbon with two to four carbon atoms, water can be separated through condensation. The paraffin hydrocarbon with two to four carbon atoms is usually contained in a natural gas-based city gas and does not cause a problem unless the concentration thereof is extremely high; on the contrary, there is an advantage in that the calorific value of the fuel gas per unit volume can be high.

Note that the carbon monoxide methanation reaction (Formula 3) is an exothermic reaction that generates approximately 70 kJ per mole of hydrogen, and involves heat generation greater than that of the carbon dioxide methanation reaction.

$$CO+3H_2 \rightarrow CH_4+H_2O \quad \text{(Formula 3)}$$

Based on the above consideration regarding the calorific value, it is conceivable that hydrogen in the first fuel gas can be reduced by adding carbon monoxide, as a predetermined reactant, to the first fuel gas that contains methane obtained in the first step, as the main component thereof, and further causing a methanation reaction. However, carbon monoxide reacts with water vapor to generate hydrogen and carbon dioxide through the CO shift reaction (Formula 2). Under a condition in which a typical methanation catalyst is active in the carbon monoxide methanation reaction, such a methanation catalyst is also active in the CO shift reaction, and therefore it is not possible to selectively advance only the carbon monoxide methanation reaction. Therefore, even if carbon monoxide is used as the predetermined reactant in the second step, the hydrogen concentration cannot be sufficiently reduced.

Configuration of First Step

The following describes the configuration of the first step in detail.

The hydrogen and carbon oxide used for the mixed gas 1 in the first step can be produced through any method as long as they are of a purity and properties that do not interfere with the methanation reaction in the presence of the first catalyst (a methanation catalyst). The hydrogen may be, for example, electrolytic hydrogen obtained by electrolyzing water. The carbon oxide is a carbon monoxide or a carbon dioxide or a mixture thereof. The carbon dioxide may be obtained by collecting it from a combustion exhaust gas, using a known carbon dioxide collection method such as the amine absorption method, or may be a carbon dioxide contained in a biogas obtained as a result of methane fermentation of an organic material. The biogas is typically obtained as a mixed gas of methane and carbon dioxide. It is possible to use the carbon dioxide in the methanation reaction by separating it from this mixed gas, or use the mixed gas in the methanation reaction without separating the methane therefrom.

If hydrogen and carbon oxide contain sulfur, a halogen compound, a siloxane compound, or a heavy hydrocarbon, these components may cause degradation of the first catalyst (the methanation catalyst). Therefore, it is preferable to remove these components before subjecting hydrogen and carbon oxide to the methanation reaction if necessary.

A known methanation catalyst that contains Ni, Ru or the like may be used as the first catalyst in the first step.

The first reactor 10 to be used in the first step is not particularly limited to being in any form as long as the hydrogen concentration of the first fuel gas 2 after the methanation reaction is from 2% to 10% by volume after dehydration. However, the methanation reaction is an equilibrium reaction that generates a relatively large amount of heat, and the equilibrium conversion varies greatly depending on the temperature and the pressure as shown in FIGS. 2 and 3, where the lower the temperature is and the higher the pressure is, the higher the equilibrium conversion is. On the other hand, there are problems in that it is difficult to secure the activity of the first catalyst (the methanation catalyst) at low temperature, and facility costs are high if high pressure is to be achieved.

In addition, the methanation reaction generates a relatively large amount of heat, and therefore it is not possible to ignore the fact that the temperature of the gas rises as the reaction progresses, and the equilibrium conversion decreases accordingly. In light of the above, when a fixed-bed adiabatic reactor that is most commonly used for chemical processes is used as the first reactor 10, it is usually difficult to obtain the desired conversion in a single stage, and therefore it is preferable to couple reactors to each other in multiple stages, and employ a process in which the outlet gas whose temperature has been increased due to the reaction heat is cooled, and is thereafter introduced to the reactor in the next stage.

FIG. 4 shows an example of a configuration in which the first reactor 10 is provided as a fixed-bed adiabatic multi-stage reactor. In this reactor configuration, five sets each consisting of a reactor and a heat exchanger, namely reactors (11a to 15a) in which the methanation reaction proceeds, and heat exchangers (11b to 15b), are provided. In the configuration of the first reactor 10 shown in FIG. 4, when the raw material gas in which the ratio of hydrogen to carbon dioxide, which is the stoichiometric ratio, is 4:1 is caused to react at an inlet temperature of 250° C. and a reaction pressure of 0.7 MPa in each stage, the inlet and outlet temperatures and the conversation rate of the carbon dioxide methanation in each stage are as shown in FIG. 5. At the outlet of the fourth stage (14a), the conversion of the carbon dioxide methanation is 94.3%. In this stage, the hydrogen concentration in the gas is 18.3% (by volume after dehydration, the same applies hereinafter). At the outlet of the fifth stage (15a), the conversion of the carbon dioxide methanation is 97.7% and the hydrogen concentration in the gas has decreased to 8.3%, which is lower than 10%. Therefore, for methanation through a simple adiabatic multi-stage reaction, it is necessary to employ a five-stage reaction to achieve a hydrogen concentration that is no greater than 10% under the aforementioned temperature and pressure conditions. In addition, the outlet temperature of the first stage reaches approximately 700° C. due to a large amount of heat generated through the methanation, which is problematic from the standpoint of the durability of the catalyst.

Figure 6:
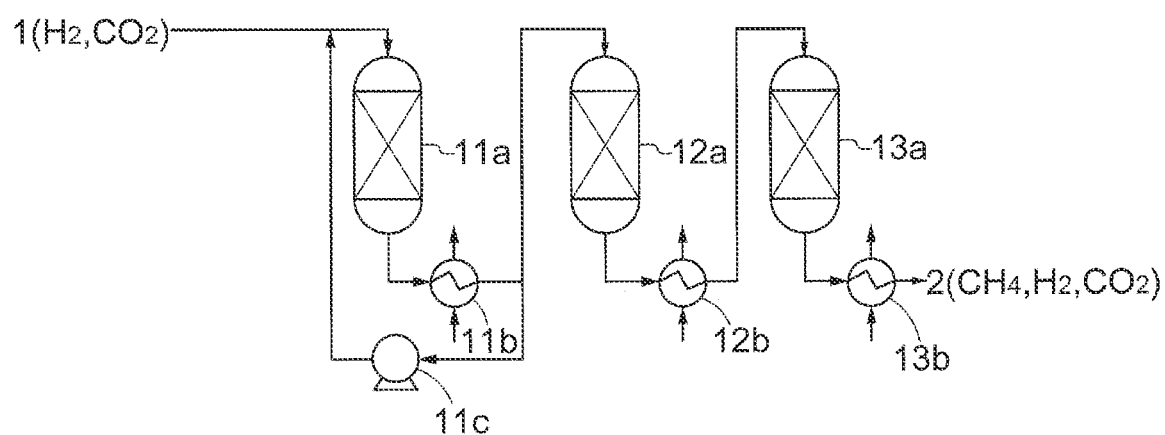
FIG. 6 shows an example of a configuration of a reactor for the methanation reaction (a fixed-bed adiabatic multi-stage reactor that includes a recycling line that returns a gas from an outlet of a first stage to an inlet of the first stage).

FIG. 6 shows an example of a configuration in which the first reactor 10 is provided as a fixed-bed adiabatic multi-stage reactor that includes a recycling line. In this reactor configuration, three sets each consisting of a reactor and a heat exchanger, namely reactors (11a to 13a) in which the methanation reaction proceeds, and heat exchangers (11b to 13b), are provided, and the first set of these sets includes a recycling line 11c that returns the product after heat exchange to the reactor 11a. This reactor configuration improves the durability of the catalyst because the dilution effect suppresses a rise in temperature. In addition, a decrease in the reactor outlet temperature produces the effect of increasing the equilibrium conversion, and therefore the number of stages in the reactor may be smaller than that in a configuration of a simple multi-stage reactor.

Figure 7:
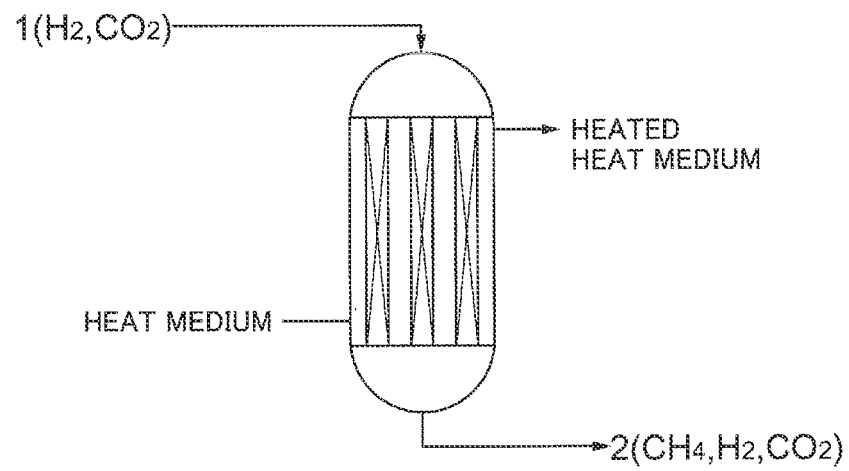
FIG. 7 shows an example of a configuration of a reactor for the methanation reaction (a heat exchange reactor).

FIG. 7 shows an example of a configuration in which the first reactor 10 is provided as a heat exchange reactor. With this reactor configuration, it is possible to cause a reaction while maintaining the catalyst bed temperature at a predetermined level, and as a result, it is also possible to obtain a high conversion in a single-stage reactor. However, heat exchange reactors are complex in structure and the facility and maintenance costs thereof can be expensive. In addition, imbalance between the heat generated through the reaction and the heat removed through the heat exchange may cause a local high-temperature area, which may deteriorate the catalyst in a short period of time.

Figure 8:
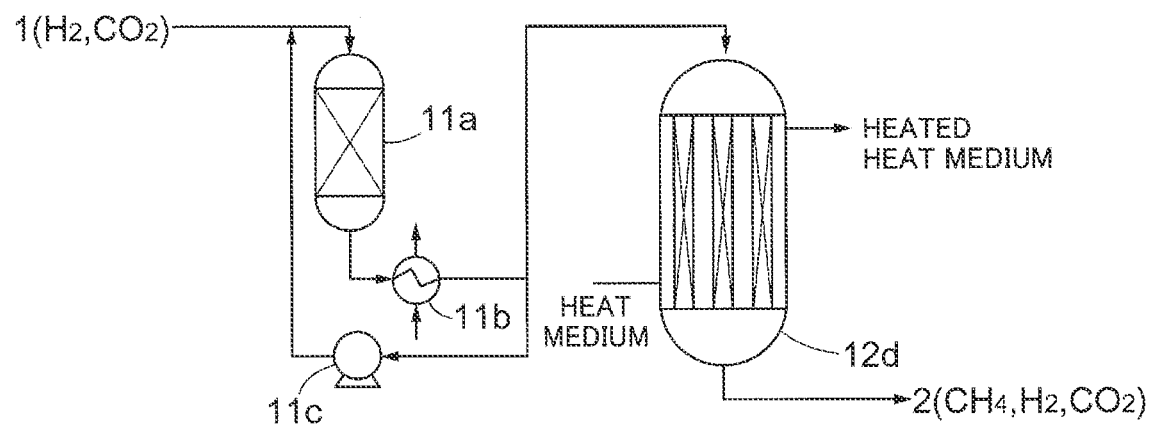
FIG. 8 shows an example of a configuration of a reactor for the methanation reaction (the first stage is a fixed-bed adiabatic reactor with a recycling line, and the second stage is a heat exchange reactor).

FIG. 8 shows an example of a configuration in which the first reactor 10 is formed by combining a fixed-bed adiabatic reactor that includes a recycle line, and a heat exchange reactor. In this reactor configuration, the reactors (12a, 13a) and the heat exchanger (12b, 13b) of the sets in the second stage and the following stages in the example shown in FIG. 6 are replaced with one heat exchange reactor. With this reactor configuration, it is possible to reduce the number of reactor stages while maintaining the durability of the catalyst to reduce facility costs.

Example of First Step

In the following description, the configuration of the reactor shown in FIG. 8 is employed as the configuration of the first reactor 10, and it is assumed that a sufficient amount of methanation catalyst is used to obtain the equilibrium composition of the methanation reaction and the CO shift reaction under a predetermined condition.

Figure 9:
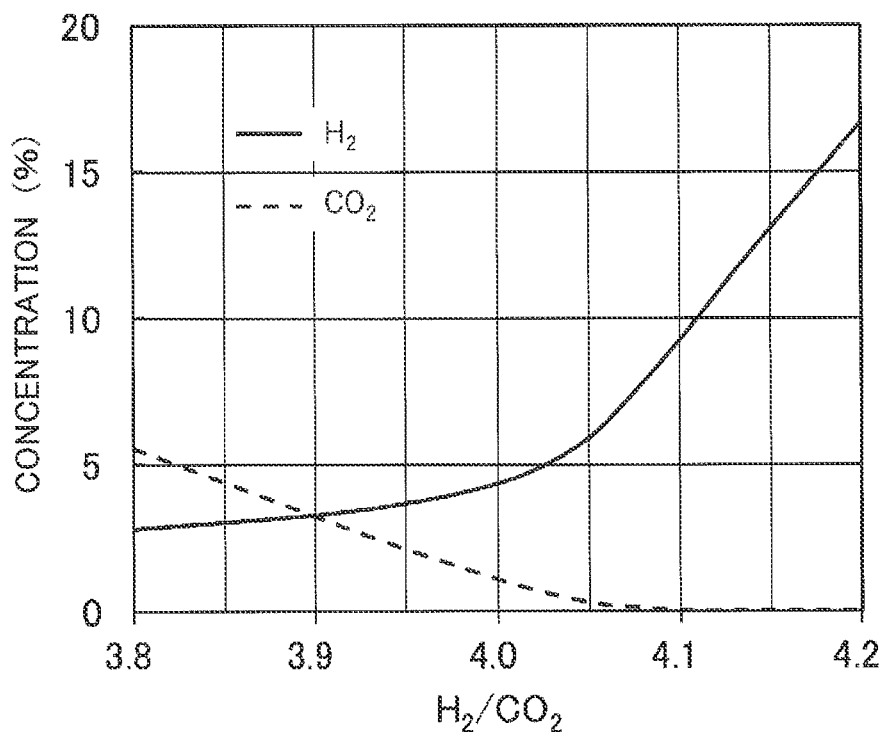
FIG. 9 is a diagram showing the effect of the ratio of the hydrogen to the carbon dioxide at the inlet, on the hydrogen and carbon dioxide concentrations in the equilibrium composition (after dehydration) of the carbon dioxide methanation reaction (at a reaction pressure of 0.7 MPa).

If a methanation reaction is caused when the molar ratio of hydrogen to carbon dioxide (the molar ratio of hydrogen/carbon dioxide) at the inlet is in the range of 3.8 to 4.1 and the reaction temperature in the second stage is 250° C., the concentrations of hydrogen and carbon dioxide contained in the gas after the methanation reaction are as shown in FIG. 9 when the reaction pressure is 0.7 MPa. When the molar ratio of hydrogen to carbon dioxide is 4.0, the hydrogen concentration is 4.4% and the carbon dioxide concentration is 1.1%. The hydrogen concentration can be reduced by reducing the molar ratio of hydrogen to carbon dioxide. However, even when the molar ratio is reduced to 3.8, the hydrogen concentration does not decrease to 2% or lower, and the carbon dioxide concentration increases to 5.6%. That is to say, when the reaction pressure is 0.7 MPa, it is not possible to obtain a fuel gas in which the hydrogen concentration and carbon dioxide are sufficiently reduced.

Figure 10:
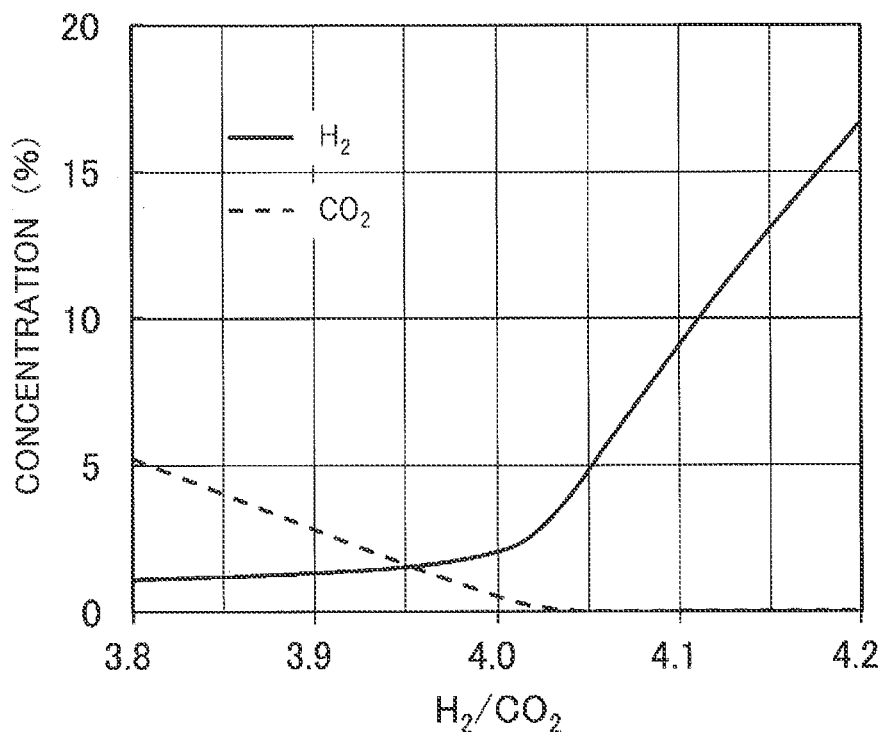
FIG. 10 is a diagram showing the effect of the ratio of the hydrogen to the carbon dioxide at the inlet, on the hydrogen and carbon dioxide concentrations in the equilibrium composition (after dehydration) of the carbon dioxide methanation reaction (at a reaction pressure of 5 MPa).

When the reaction pressure is 5 MPa, the hydrogen and carbon dioxide contained in the gas after the methanation reaction are as shown in FIG. 10. When the molar ratio of hydrogen to carbon dioxide is 4.0, the hydrogen concentration is 2.04% and the carbon dioxide concentration is 0.51%. Under this condition, a fuel gas that generally meets a quality criterion that requires the hydrogen concentration to be 2% or less and the carbon dioxide concentration to be 0.5% or less (this criterion is the strictest to the extent that it is generally known) can be obtained. However, under this condition, only a slight decrease in the molar ratio of hydrogen to carbon dioxide increases the carbon dioxide concentration, while a slight increase in the molar ratio of hydrogen to carbon dioxide increases the hydrogen concentration. Thus, small variations in the molar ratio of hydrogen to carbon dioxide significantly affect the purity of the resulting fuel gas.

That is to say, when a fuel gas that contains methane as the main component thereof is to be obtained through the hydrogen and carbon dioxide methanation reactions alone, a high-pressure reaction facility that achieves a working pressure sufficiently higher than 5 MPa is required to obtain fuel gas that meets the aforementioned quality criterion that requires a hydrogen concentration of 2% or less and a carbon dioxide concentration of 0.5% or less.

Configuration of Second Step

In the following, examples of the configuration of the second step are described one after another: an example in which the second catalyst is active in the dehydration reaction of an alcohol and the hydrogenation reaction of an olefin (a first embodiment), an example in which the second catalyst is active in the hydrogenation reaction of an olefin (a second embodiment), and an example in which the second catalyst is selectively active in the oxidation reaction of hydrogen (a third embodiment).

First Embodiment

According to the first embodiment of the second step, a dehydration-hydrogenation catalyst that is active in the dehydration reaction of an alcohol and the hydrogenation reaction of an olefin is used as the second catalyst, and an alcohol with two to four carbon atoms is used as the predetermined reactant. In this embodiment, the dehydration-hydrogenation reaction of the alcohol proceeds in the second step.

In the case of the first embodiment, in FIG. 1, the predetermined reactant 3 is an alcohol with two to four carbon atoms, and the second fuel gas 4 contains an olefin hydrocarbon, carbon dioxide, and hydrogen. The second reactor 20 functions as a dehydration-hydrogenation reactor.

An alcohol 3 that is to be used in the first embodiment comprises at least one alcohol selected from among alcohols that each have two to four carbon atoms. That is to say, the alcohol 3 is one alcohol selected from the group consisting of ethanol, 1-propanol, 2-propanol, 1-butanol, 2-butanol, and 2-methyl-2-butanol, or a mixture of a plurality of alcohols selected from this group.

The alcohol 3 may be produced through any method as long as it has a purity and properties that do not hinder the dehydration-hydrogenation reaction. For example, an alcohol produced through a fermentation method, using sugar cane, corn, or the like as a raw material may also be desirably used. In the fuel gas production method according to the present embodiment, the alcohol 3 may contain as much water as it typically contains However, if the alcohol 3 contains too much water, the heat of vaporization for vaporizing the water is required, which may reduce the efficiency of fuel gas production. Considering this, it is preferable that the water content in the alcohol 3 with two to four carbon atoms is no greater than 50 mass %.

The reaction in the second reactor 20 proceeds as follows. In the second reactor 20, the alcohol dehydration reaction (Formula 4) and the olefin hydrogenation reaction (Formula 5) proceed.

$$C_nH_{2n+1}OH \rightarrow C_nH_{2n}+H_2O \quad \text{(Formula 4)}$$

$$C_nH_{2n}+H_2 \rightarrow C_nH_{2n+2} \quad \text{(Formula 5)}$$

Note that n is 2, 3, or 4.

Here, the paraffin hydrocarbon ($C_nH_{2n+2}$) obtained through the hydrogenation reaction of the olefin contains the paraffin hydrocarbon corresponding to the alcohol 3 used. For example, when the alcohol 3 contains ethanol ($C_2H_5OH$, n=2), the paraffin hydrocarbon contains ethane ($C_2H_6$).

When the amount of alcohol 3 added is small, the reduction of the hydrogen concentration in the second fuel gas 4 will be insufficient. On the other hand, when the amount of alcohol 3 added is large, the hydrogen concentration will be extremely low, the hydrogenation reaction of the olefin (Formula 5) will not proceed sufficiently, and the olefin may remain in the second fuel gas 4. In addition, the olefin concentration will be high during the reaction, and the olefin may be polymerized on the catalyst, and the catalyst may deteriorate due to carbon precipitation from the catalyst, which can be problematic. Therefore, the amount of alcohol 3 to be added is preferably such that the molar ratio of the alcohol 3 to the hydrogen (alcohol)/(hydrogen) contained in the first fuel gas 2 obtained in the first step is no less than 0.45 and no more than 0.90.

It is preferable that the second catalyst (dehydration-hydrogenation catalyst) to be used in the first embodiment is active in the dehydration reaction of the alcohol (Formula 4) and the hydrogenation reaction of the olefin (Formula 5), and is substantially inactive in the steam reforming reaction of methane, ethane, propane, or butane. When a catalyst that is active in the steam reforming reaction of methane, ethane, propane, and butane is used, even if hydrogen is reduced through the hydrogenation reaction of the olefin, hydrogen is newly generated through the steam reforming reaction of methane, ethane, propane, or butane. Therefore, it may be impossible to reduce the hydrogen concentration in the fuel gas. Examples of a catalyst that exhibits such chemoselectivity include a catalyst in which at least either palladium or platinum is supported by a solid acid catalyst.

The reaction temperature of the rection through which an alcohol reacts with hydrogen and is converted into paraffin hydrocarbon with the use of the second catalyst is preferably from 200° C. to 400° C. The catalyst (the second catalyst) that is active in the dehydration reaction of an alcohol and the hydrogenation reaction of an olefin generally exhibits excellent activity under a condition where the temperature thereof is 200° C. or higher. Therefore, when the reaction temperature is 200° C. or higher, the reaction between the alcohol 3 with two to four carbon atoms and hydrogen (Formulas 4 and 5) readily proceeds. Also, if the reaction temperature is 400° C. or lower, it is easier to suppress the steam reforming reaction of methane, ethane, propane, and butane. It is particularly preferable that the reaction temperature is from 250° C. to 350° C.

The second reactor 20 to be used in the first embodiment is not particularly limited to being in any form, and may be, for example, a fixed-bed adiabatic reactor, a fixed-bed adiabatic reactor that includes a recycling line, a heat exchange reactor, or the like.

Example According to First Embodiment

The following describes an example in which the first reactor 10 employs the configuration of the reactor shown in FIG. 8, and the second reactor 20 (not shown) configured as a fixed-bed adiabatic reactor is provided downstream of the first reactor 10. Note that, in this example, the methanation reaction and the CO shift reaction had reached equilibrium in the first reactor 10, ethanol was used as the alcohol 3, and the dehydration reaction of ethanol and the hydrogenation reaction of ethylene had reached equilibrium in the second reactor 20.

In the following example, the reaction temperature of a heat exchange reactor 12d in the first reactor 10 was set to 250° C. In addition, the inlet temperature of the second reactor 20 was set to 250° C., so that the reaction proceeded under adiabatic conditions. The reaction pressure was set to 0.7 MPa in both the first reactor 10 and the second reactor 20. The hydrogen and carbon dioxide concentrations in the second fuel gas 4 obtained in this case are shown in FIGS. 11 and 12 with respect to the molar ratio of hydrogen to carbon dioxide in the mixed gas 1 supplied to the first reactor 10.

Figure 11:
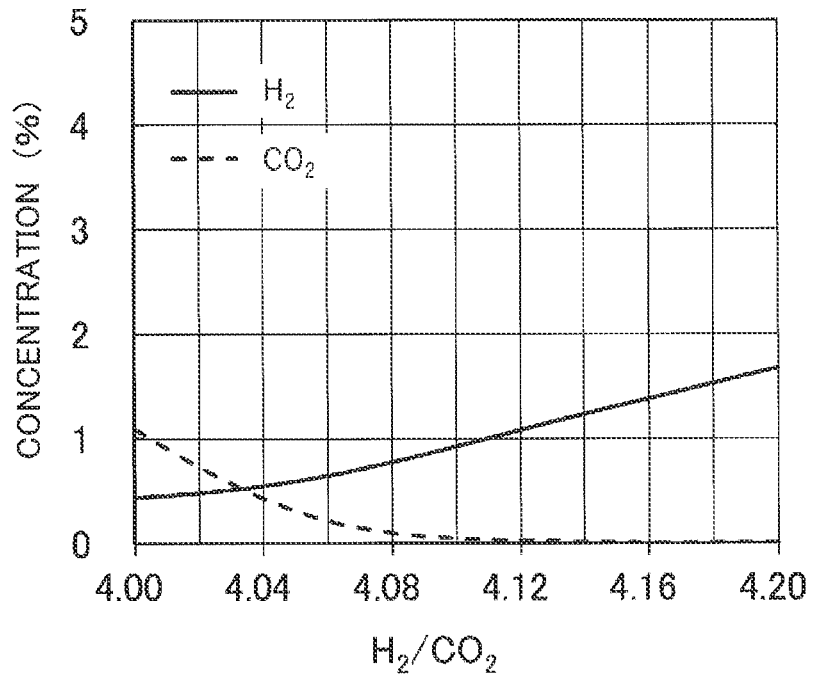
FIG. 11 is a diagram showing the effect of the ratio of the hydrogen to the carbon dioxide at the inlet, on the hydrogen and carbon dioxide concentrations in the equilibrium composition (after dehydration) of fuel gas obtained through a method for producing fuel gas according to the present invention (the molar ratio of the ethanol to the hydrogen is 0.9).
Figure 12:
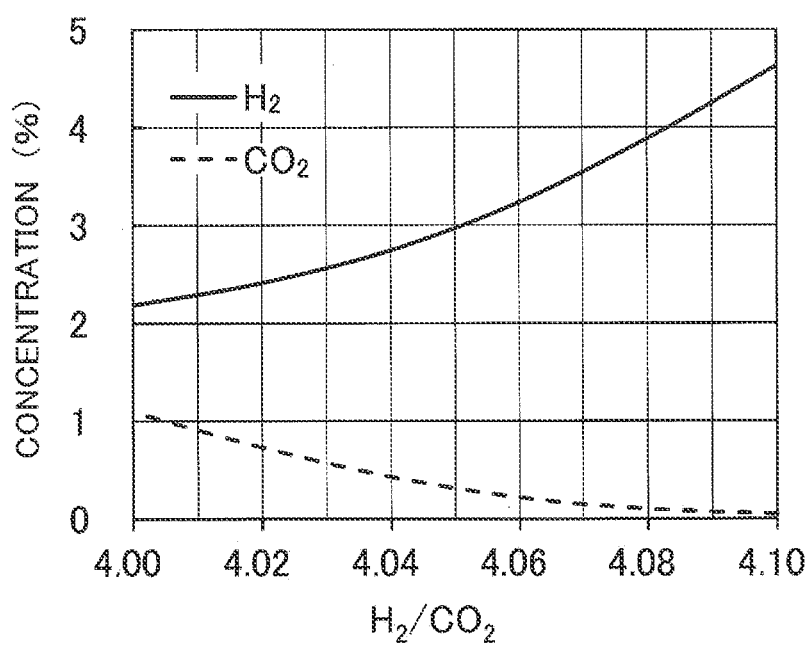
FIG. 12 is a diagram showing the effect of the ratio of the hydrogen to the carbon dioxide at the inlet, on the hydrogen and carbon dioxide concentrations in the equilibrium composition (after dehydration) of fuel gas obtained through a method for producing fuel gas according to the present invention (the molar ratio of the ethanol to the hydrogen is 0.5).

FIG. 11 shows a relationship between the composition of the mixed gas 1 and the hydrogen and carbon dioxide concentrations in the second fuel gas 4 when the amount of ethanol added is 0.9 in terms of the molar ratio to the hydrogen contained in the first fuel gas 2. When the molar ratio of hydrogen to carbon dioxide in the mixed gas 1 is 4.0, the hydrogen concentration is 0.44% and the carbon dioxide concentration is 1.09%. When only the first step is carried out under the same conditions, the hydrogen concentration is 4.4% and the carbon dioxide concentration is 1.1% (FIG. 9). Therefore, it can be seen that the hydrogen concentration in the first fuel gas 2 obtained in the first step is significantly reduced in the second step. When the molar ratio of hydrogen to carbon dioxide is 4.04, the hydrogen concentration is 0.55%, the carbon dioxide concentration is 0.43%, the methane concentration is 94.1%, and the ethane concentration is 4.9%, and therefore the concentration of hydrocarbon (methane+ethane) components is more than 99%. When only the first step is carried out, the hydrogen concentration is 5.5% and the carbon dioxide concentration is 0.43%. Therefore, it can be seen that the hydrogen concentration is significantly reduced in the second step in this case as well.

Although both the first step and the second step are carried out at the same inlet temperature (250° C.), hydrogen remains in the first step and hydrogen decreases in the second step for the following reason. The carbon dioxide methanation reaction is an exothermic reaction that generates 41 kJ per mole of hydrogen. On the other hand, the hydrogenation reaction of ethylene is a reaction that generates a slightly larger amount of heat (heat generation of 136 kJ per mole of ethylene), and a combination thereof with the dehydration reaction of ethanol (heat absorption of 45 kJ per mole of ethanol) is an exothermic reaction that generates approximately 90 kJ per mole of hydrogen. Therefore, the generation of the ethane resulting from the generation of the ethylene through the dehydration of ethanol and the subsequent hydrogenation of ethylene is remarkably biased toward the ethane generation side in equilibrium. Therefore, even under the temperature condition in which hydrogen remains in the first step, the reaction in the second step (the dehydration hydrogenation reaction) sufficiently proceeds.

When 1-propanol is used instead of ethanol as the alcohol 3, the endothermic reaction of 1-propanol absorbs 33 kJ per mole of 1-propanol, the hydrogenation reaction of propylene generates 125 kJ per mole of propylene, and therefore the entire reaction in the second step is an exothermic reaction that generates approximately 90 kJ per mol of hydrogen. Even when another alcohol with two to four carbon atoms is used, the entire reaction in the second step is an exothermic reaction that generates approximately 65 to 95 kJ per mole of hydrogen, and the reaction in the second step sufficiently proceeds in the same manner.

In the second step, carbon dioxide cannot be reduced. If the molar ratio of the hydrogen to the carbon dioxide to be subjected to the first step is increased so as to be slightly higher than 4.0 so that the first step is carried out under conditions where hydrogen is slightly excessive, the carbon dioxide concentration in the first fuel gas 2 can be reduced through the first step. Here, as a result of adding an excessive amount of hydrogen, the hydrogen concentration in the first fuel gas 2 increases, but the hydrogen can be reduced in the second step. When the molar ratio of the hydrogen to the carbon dioxide in the mixed gas 1 to be subjected to the first step is 4.04, the hydrogen concentration and the carbon dioxide concentration in the fuel gas that can be obtained are 0.55% and 0.43%, respectively. That is to say, the quality criterion that requires the hydrogen concentration to be 2% or less and the carbon dioxide concentration to be 0.5% or less, which cannot be achieved by the first step alone even under a high pressure reaction condition at 5 MPa, can be achieved through a reaction at a low pressure of 0.7 MPa if the method according to the present embodiment is used.

If the molar ratio of the hydrogen to the carbon dioxide in the mixed gas 1 to be subjected to the first step is further increased, the carbon dioxide concentration in the fuel gas that can be obtained can be further reduced. On the other hand, in addition to the fact that a larger amount of alcohol 3 is to be added, if the second step is carried out under adiabatic conditions, the outlet temperature of the second step becomes higher and the olefin concentration becomes higher. As a result, other concerns arise regarding deterioration of the second catalyst due to carbon precipitation, and an increase in the hydrogen and carbon dioxide concentrations due to the co-occurrence of the steam reforming reaction. From this viewpoint, it is preferable that the molar ratio of the hydrogen to the carbon dioxide in the mixed gas 1 to be subjected to the first step does not exceed 4.08. If the molar ratio of the hydrogen to the carbon dioxide is in the range of 4.04 to 4.08, it is easier to achieve the quality criterion that requires the hydrogen concentration to be 2% or less and the carbon dioxide concentration to be 0.5% or less. Note that when a carbon dioxide and a carbon monoxide are contained as carbon oxides, the ratio (molar ratio) of the hydrogen to the carbon oxide is likely to meet the above quality criterion if the value of {(hydrogen)+(carbon monoxide)}/{(carbon monoxide)+(carbon dioxide)} calculated based on the amount of substance falls within the range of 4.04 to 4.08.

FIG. 12 shows a relationship between the composition of the mixed gas 1 and the hydrogen and carbon dioxide concentrations in the second fuel gas 4 when the amount of ethanol added is 0.5 in terms of the molar ratio to the hydrogen contained in the first fuel gas 2. In the example in FIG. 12, the amount of ethanol added is smaller than in the example in FIG. 11, and therefore the hydrogen concentration in the second fuel gas 4 that can be obtained is higher than in FIG. 11. However, in comparison with FIG. 9, it can be understood that the hydrogen concentration in the second fuel gas 4 is reduced. If the molar ratio of hydrogen to carbon dioxide in the mixed gas 1 is in the range of 4.04 to 4.08, it is possible to achieve all of the quality criterions that require the hydrogen concentration to be 4% or less, the carbon dioxide concentration to be 0.5% or less, and components other than the hydrocarbons to be 4% or less. This condition cannot be achieved through the methanation reaction at 0.7 MPa, no matter what value the molar ratio of the hydrogen to the carbon dioxide in the mixed gas to be subjected to the methanation reaction is set to. Therefore, it is clear that the method according to the present invention is useful for producing a high-quality fuel gas without the use of a high-pressure reaction facility. Note that, even in this case, as in the above case, when a carbon dioxide and a carbon monoxide are contained as carbon oxides, the ratio (molar ratio) of the hydrogen to the carbon oxide is likely to meet the above quality criterion if the value of {(hydrogen)+ (carbon monoxide)}/{(carbon monoxide)+(carbon dioxide)} calculated based on the amount of substance falls within the range of 4.04 to 4.08.

Second Embodiment

According to a second embodiment of the second step, a hydrogenation catalyst that is active in the hydrogenation reaction of an olefin is used as the second catalyst, and an olefin hydrocarbon with two to four carbon atoms is used as the predetermined reactant. In this embodiment, the hydrogenation reaction of the olefin proceeds in the second step.

In the case of the second embodiment, in FIG. 1, the predetermined reactant 3 is a paraffin hydrocarbon with two to four carbon atoms, and the second fuel gas 4 contains an olefin hydrocarbon, carbon dioxide, and hydrogen. The second reactor 20 functions as a hydrogenation reactor.

An olefin hydrocarbon 3 that is to be used in the second embodiment comprises at least one olefin hydrocarbon selected from among olefin hydrocarbons that each have two to four carbon atoms. That is to say, the olefin hydrocarbon 3 is one kind of olefin hydrocarbon selected from the group consisting of ethylene, propylene, 1-butene, 2-butene, and 2-methylpropene, or a mixture of a plurality of olefin hydrocarbons selected from this group.

The olefin hydrocarbon 3 may be produced through any method as long as it has a purity and properties that do not hinder the hydrogenation reaction. For example, the olefin hydrocarbon 3 may be obtained by passing a methanol over a zeolite catalyst at 300° C. to 500° C. to convert the methanol through an MTO reaction, to an olefin hydrocarbon that has two to four carbon atoms. The hydrocarbons obtained through the MTO reaction contain a small amount of paraffin hydrocarbon with one to four carbon atoms in addition to the olefin hydrocarbon with two to four atoms. However, the olefin hydrocarbons with two to four atoms, to be subjected to the hydride reaction, may contain paraffin hydrocarbon with one to four carbon atoms.

The products of the MTO reaction may also contain olefin a hydrocarbon with five or more carbon atoms, a paraffin hydrocarbon, and an aromatic hydrocarbon, which may, for example, condense depending on the temperature and pressure conditions and affect the quality of the fuel gas. Therefore, it is preferable to remove them before being subjected to the hydrogenation reaction.

The reaction in the second reactor 20 proceeds as follows. In the second reactor 20, the olefin hydrogenation reaction (Formula 5) proceeds.

$$C_nH_{2n}+H_2 \rightarrow C_nH_{2n+2} \quad \text{(Formula 5)}$$

Note that n is 2, 3, or 4.

Here, the paraffin hydrocarbon ($C_nH_{2n+2}$) obtained through the hydrogenation reaction of the olefin contains the paraffin hydrocarbon corresponding to the olefin hydrocarbon 3 used. For example, if the olefin hydrocarbon 3 contains ethylene ($C_2H_4$, n=2), the paraffin hydrocarbon contains ethane ($C_2H_6$).

When the amount of olefin hydrocarbon 3 added is small, the reduction of the hydrogen concentration in the second fuel gas 4 will be insufficient. On the other hand, when the amount of olefin hydrocarbon 3 added is large, the hydrogen concentration will be extremely low, the hydrogenation reaction of the olefin hydrocarbon (Formula 5) will not proceed sufficiently, and the olefin hydrocarbon with two to four carbon atoms may remain in the second fuel gas 4. In addition, the olefin hydrocarbon concentration will be high during the reaction, and the olefin hydrocarbon may be polymerized on the second catalyst, and the second catalyst may deteriorate due to carbon precipitation from the second catalyst, which can be problematic. Therefore, the amount of olefin hydrocarbon 3 to be added is preferably such that the molar ratio of the olefin hydrocarbon 3 to the hydrogen (olefin hydrocarbon/hydrogen) contained in the first fuel gas 2 obtained in the first step is no less than 0.5 and no more than 0.9.

It is preferable that the second catalyst (hydrogenation catalyst) to be used in the second embodiment is active in the hydrogenation reaction of the olefin hydrocarbon (Formula 5), and is substantially inactive in the steam reforming reaction of methane and a paraffin hydrocarbon that has two to four carbon atoms. When a catalyst that is active in the steam reforming reaction of methane and a paraffin hydrocarbon that has two to four carbon atoms is used, even if hydrogen is reduced through the hydrogenation reaction of the olefin hydrocarbon that has two to four carbon atoms, hydrogen is newly generated through the steam reforming reaction of methane or the paraffin hydrocarbon that has two to four carbon atoms. Therefore, it may be impossible to reduce the hydrogen concentration in the fuel gas. Examples of a catalyst that exhibits such reaction selectivity include a catalyst in which at least either palladium or platinum is supported by an inorganic oxide support.

The reaction temperature of the rection through which an olefin hydrocarbon reacts with hydrogen and is converted into paraffin hydrocarbon with the use of the second catalyst is preferably from 200° C. to 400° C. Hydrogenation catalysts generally exhibit excellent activity under a condition where the temperature thereof is 200° C. or higher. Therefore, when the reaction temperature is 200° C. or higher, the reaction between the olefin hydrocarbon 3 with two to four carbon atoms and hydrogen (Formula 5) readily proceeds. Also, when the reaction temperature is 400° C. or lower, it is easier to suppress the steam reforming reaction of methane and the paraffin hydrocarbon with two to four carbon atoms. It is particularly preferable that the reaction temperature is from 200° C. to 300° C.

The second reactor 20 to be used in the second embodiment is not particularly limited to being in any form, and may be, for example, a fixed-bed adiabatic reactor, a fixed-bed adiabatic reactor that includes a recycling line, a heat exchange reactor, or the like.

Example According to Second Embodiment

The following describes an example in which the first reactor 10 employs the configuration of the reactor shown in FIG. 8, and the second reactor 20 (not shown) configured as a fixed-bed adiabatic reactor is provided downstream of the first reactor 10. Note that, in this example, the methanation reaction and the CO shift reaction had reached equilibrium in the first reactor 10, and the hydrogenation reaction of the olefin hydrocarbon had reached equilibrium in the second reactor 20.

In the following example, the reaction temperature of the heat exchange reactor 12d in the first reactor 10 was set to 250° C. A gas consisting of 90% propylene and 10% propane (by volume) was used as a gas that contains an olefin hydrocarbon, and the inlet temperature of the second reactor 20 was set to 220° C. to allow the reaction to proceed under adiabatic conditions. The reaction pressure was set to 0.7 MPa in both the first reactor 10 and the second reactor 20. The hydrogen and carbon dioxide concentrations in the second fuel gas 4 obtained in this case are shown in FIGS.

13 and 14 with respect to the molar ratio of the hydrogen to the carbon dioxide in the mixed gas 1 supplied to the first reactor 10.

Figure 13:
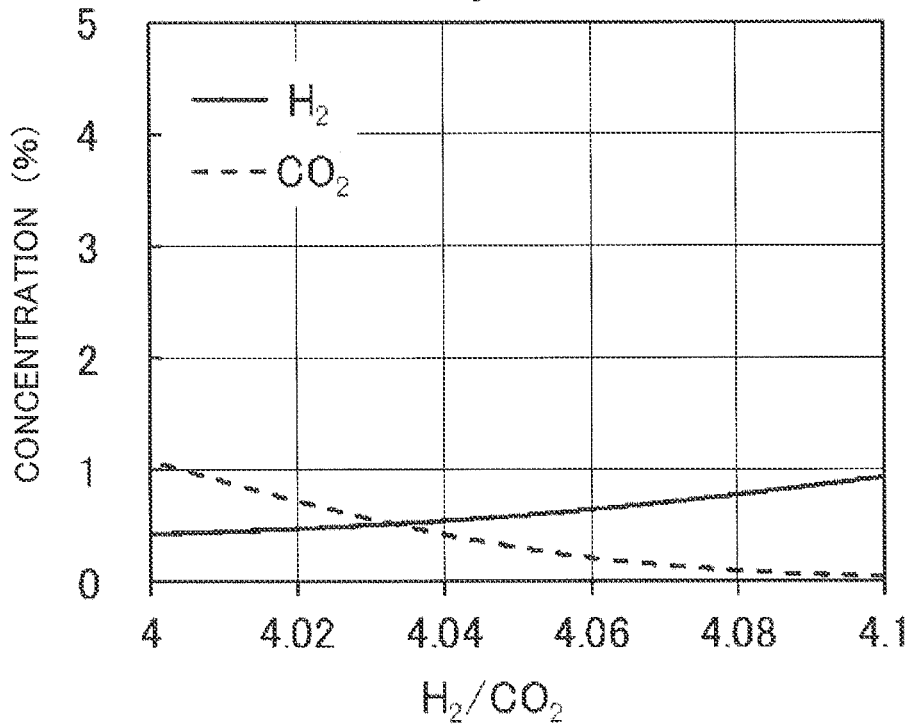
FIG. 13 is a diagram showing the effect of the ratio of the hydrogen to the carbon dioxide at the inlet, on the hydrogen and carbon dioxide concentrations in the equilibrium composition (after dehydration) of fuel gas obtained through a method for producing fuel gas according to the present invention (the molar ratio of an olefin hydrocarbon with two to four carbon atoms to hydrogen is 0.9).

FIG. 13 shows a relationship between the composition of the mixed gas 1 and the hydrogen and carbon dioxide concentrations in the second fuel gas 4 when the amount of propylene added, which corresponds to the olefin hydrocarbon 3 with two to four carbon atoms, is 0.9 in terms of the molar ratio to the hydrogen contained in the first fuel gas 2 (i.e., the molar ratio of propylene+propane to the hydrogen is 1.0). When the molar ratio of the hydrogen to the carbon dioxide in the mixed gas 1 is 4.0, the hydrogen concentration is 0.44% and the carbon dioxide concentration is 1.09%, and the outlet temperature of the second step is 263° C. When only the first step is carried out under the same conditions, the hydrogen concentration is 4.4% and the carbon dioxide concentration is 1.1% (FIG. 9). Therefore, it can be seen that the hydrogen concentration in the first fuel gas 2 obtained in the first step is significantly reduced in the second step. When the molar ratio of the hydrogen to the carbon dioxide is 4.04, the hydrogen concentration is 0.55%, the carbon dioxide concentration is 0.43%, the methane concentration is 93.6%, the propane concentration is 5.5%, the outlet temperature of the second step is 273° C., and therefore the concentration of hydrocarbon (methane+propane) components is more than 99%. When only the first step is carried out, the hydrogen concentration is 5.5% and the carbon dioxide concentration is 0.43%. Therefore, it can be seen that the hydrogen concentration is significantly reduced in the second step in this case as well.

Although both the first step and the second step are carried out at substantially the same temperature (approximately 250° C.), hydrogen remains in the first step and hydrogen decreases in the second step for the following reason. The carbon dioxide methanation reaction is an exothermic reaction that generates 41 kJ per mole of hydrogen. On the other hand, the hydrogenation reaction of an olefin hydrocarbon that has two to four carbon atoms is a reaction that generates a slightly larger amount of heat (heat generation of 117 to 136 kJ per mole of hydrogen). Therefore, the generation of the paraffin hydrocarbon with two to four carbon atoms resulting from the hydrogenation of the olefin hydrocarbon that has two to four carbon atoms is remarkably biased toward the paraffin hydrocarbon generation side in equilibrium. Therefore, even under the temperature condition in which hydrogen remains in the first step, the reaction in the second step (the hydrogenation reaction) sufficiently proceeds.

In the second step, carbon dioxide cannot be reduced. If the molar ratio of the hydrogen to the carbon dioxide to be subjected to the first step is increased so as to be slightly higher than 4.0 so that the first step is carried out under conditions where hydrogen is slightly excessive, the carbon dioxide concentration in the first fuel gas 2 can be reduced through the first step. Here, as a result of adding an excessive amount of hydrogen, the hydrogen concentration in the first fuel gas 2 increases, but the hydrogen can be reduced in the second step. When the molar ratio of the hydrogen to the carbon dioxide in the mixed gas 1 to be subjected to the first step is 4.04, the hydrogen concentration and the carbon dioxide concentration in the fuel gas that can be obtained are 0.55% and 0.43%, respectively. That is to say, the quality criterion that requires the hydrogen concentration to be 2% or less and the carbon dioxide concentration to be 0.5% or less, which cannot be achieved by the first step alone even under a high-pressure reaction condition at 5 MPa, can be achieved through a reaction at a low pressure of 0.7 MPa if the method according to the present embodiment is used. If the molar ratio of the hydrogen to the carbon dioxide in the mixed gas 1 to be subjected to the first step is further increased, the carbon dioxide concentration in the fuel gas that can be obtained can be further reduced. However, in addition to the fact that a larger amount of olefin hydrocarbon 3 with two to four carbon atoms is to be added, if the second step is carried out under adiabatic conditions, the outlet temperature of the second step becomes higher and the olefin hydrocarbon concentration becomes higher. As a result, other concerns arise regarding deterioration of the second catalyst due to carbon precipitation, and an increase in the hydrogen and carbon dioxide concentrations due to the co-occurrence of the steam reforming reaction. From this viewpoint, it is preferable that the molar ratio of hydrogen to carbon dioxide in the mixed gas 1 to be subjected to the first step does not exceed 4.08. If the molar ratio of hydrogen to carbon dioxide is in the range of 4.04 to 4.08, it is easier to achieve the quality criterion that requires the hydrogen concentration to be 2% or less and the carbon dioxide concentration to be 0.5% or less. Note that when a carbon dioxide and a carbon monoxide are contained as carbon oxides, the ratio (molar ratio) of hydrogen to carbon oxide is likely to meet the above quality criterion if the value of {(hydrogen)+(carbon monoxide)}/{(carbon monoxide)+(carbon dioxide)} calculated based on the amount of substance falls within the range of 4.04 to 4.08.

Figure 14:
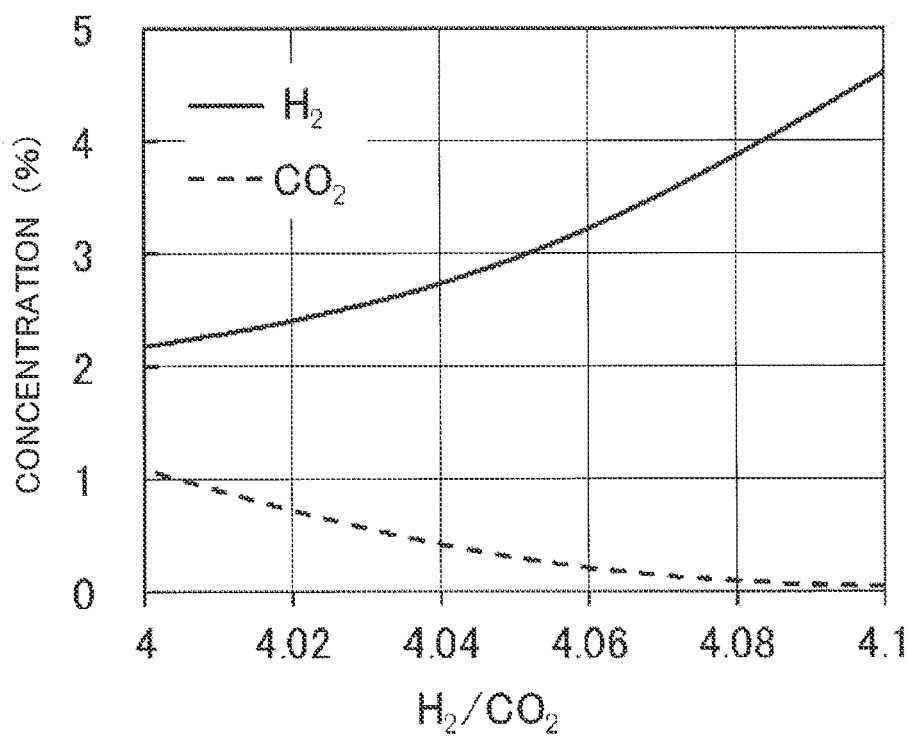
FIG. 14 is a diagram showing the effect of the ratio of the hydrogen to the carbon dioxide at the inlet, on the hydrogen and carbon dioxide concentrations in the equilibrium composition (after dehydration) of fuel gas obtained through a method for producing fuel gas according to the present invention (the molar ratio of an olefin hydrocarbon with two to four carbon atoms to hydrogen is 0.5).

FIG. 14 shows a relationship between the composition of the mixed gas 1 and the hydrogen and carbon dioxide concentrations in the second fuel gas 4 when the amount of olefin hydrocarbon 3 with two to four carbon atoms added is 0.5 in terms of the molar ratio to the hydrogen contained in the first fuel gas 2. In the example in FIG. 14, the amount of olefin hydrocarbon 3 with two to four carbon atoms added is smaller than in the example in FIG. 13, and therefore the hydrogen concentration in the second fuel gas 4 that can be obtained is higher than in FIG. 11. However, in comparison with FIG. 9, it can be understood that the hydrogen concentration in the second fuel gas 4 is reduced. If the molar ratio of hydrogen to carbon dioxide in the mixed gas 1 is in the range of 4.04 to 4.08, it is possible to achieve all of the quality criteria that require the hydrogen concentration to be 4% or less, the carbon dioxide concentration to be 0.5% or less, and components other than the hydrocarbons to be 4% or less. This condition cannot be achieved through the methanation reaction at 0.7 MPa, no matter what value the molar ratio of hydrogen to carbon dioxide in the mixed gas to be subjected to the methanation reaction is set to. Therefore, it is clear that the method according to the present invention is useful for producing a high-quality fuel gas without the use of a high-pressure reaction facility. Note that, even in this case, as in the above case, when carbon dioxide and carbon monoxide are contained as carbon oxides, the ratio (molar ratio) of hydrogen to carbon oxide is likely to meet the above quality criterion if the value of {(hydrogen)+(carbon monoxide)}/{(carbon monoxide)+(carbon dioxide)} calculated based on the amount of substance falls within the range of 4.04 to 4.08.

Third Embodiment

In a third embodiment of the second step, a selective oxidation catalyst that can selectively oxidize hydrogen is used as the second catalyst, and oxygen is used as the predetermined reactant. In this embodiment, in the second step, a selective oxidation reaction proceeds, in which hydrogen and oxygen selectively react with each other, while the reaction between methane and oxygen is suppressed.

In the case of the third embodiment, in FIG. 1, the predetermined reactant 3 is oxygen and the second fuel gas 4 contains methane, carbon dioxide, and hydrogen. The second reactor 20 functions as a selective oxidation reactor.

An oxygen 3 used in the third embodiment may be produced through any method as long as it has a purity and properties that do not hinder the oxidation reaction of hydrogen. For example, when hydrogen to be used in the first step is obtained through electrolysis of water, an amount of oxygen corresponding to a molar ratio to hydrogen (oxygen/hydrogen) of 0.5 is inevitably generated, and some of the oxygen can be used. This method is economically advantageous because the oxygen obtained through electrolysis of water is usually of high purity.

The reaction in the second reactor 20 proceeds as follows.

$$H_2 + 0.5 O_2 \rightarrow H_2O \qquad \text{(Formula 6)}$$

When the amount of oxygen 3 added is small, the reduction of the hydrogen concentration in the second fuel gas 4 will be insufficient. On the other hand, when the amount of oxygen 3 added is large, oxygen may remain in the second fuel gas 4. In addition, a rapid oxidation reaction may proceed on the second catalyst, and deterioration of the second catalyst can be problematic. Therefore, the amount of oxygen 3 to be added is preferably such that the molar ratio of the oxygen to the hydrogen (oxygen/hydrogen) contained in the first fuel gas 2 obtained in the first step is no less than 0.24 and no more than 0.45.

It is preferable that the second catalyst (selective oxidation catalyst) to be used in the third embodiment is active in the oxygen-hydrogen reaction (Formula 6), and is substantially inactive in reactions that consume methane, such as the oxidation of methane with oxygen and the steam reforming reaction of methane. If the catalyst is also highly active in the oxidation of methane, not only will the hydrogen concentration not be effectively reduced, but the amount of methane that can be obtained as a fuel gas will decrease, which may reduce the efficiency of fuel gas production. If a catalyst that exhibits activity against the steam reforming reaction of methane is used, even though hydrogen is reduced through the reaction with oxygen, hydrogen is newly generated through the steam reforming reaction of methane. Therefore, it may be impossible to reduce the hydrogen concentration in the fuel gas. Examples of a catalyst that exhibits such reaction selectivity include a catalyst in which at least either palladium or platinum is supported by an inorganic oxide support.

In the first step, even when only carbon dioxide is supplied as a carbon oxide, an extremely small amount of carbon monoxide remains in the obtained gas that consists mainly of methane, through the CO shift reaction. Regarding the second catalyst used in the third embodiment, in addition to hydrogen, carbon monoxide oxidation (Formula 7) proceeds. Therefore, it is possible to reduce carbon monoxide as well.

$$CO + 0.5 O_2 \rightarrow CO_2 \qquad \text{(Formula 7)}$$

The reaction temperature for the selective oxidation of hydrogen in the gas that consists mainly of methane, with the use of the second catalyst, is preferably from 100° C. to 400° C. The second catalyst used in the third embodiment generally exhibits excellent activity under a condition where the temperature thereof is 100° C. or higher. Therefore, when the reaction temperature is 100° C. or higher, the reaction between the oxygen 3 and hydrogen (Formula 6) and the reaction between carbon monoxide and hydrogen (Formula 7) readily proceed. Also, if the reaction temperature is 400° C. or lower, it is easier to suppress the steam reforming reaction of methane. It is particularly preferable that the reaction temperature is from 150° C. to 300° C.

Note that the first fuel gas 2 obtained in the first step contains water vapor, the amount of which is twice that of methane (based on the amount of substance (mol)) when carbon dioxide is used as the carbon oxide, and is the same as that of methane (based on the amount of substance (mol)) when carbon monoxide is used as the carbon oxide. Depending on the reaction pressure, condensation of water vapor may occur, which may cause damage to the catalyst or lower the activity thereof. Therefore, it is preferable that, before passing the first fuel gas 2 to the second reactor 20, separate the condensed water from the first fuel gas 2.

The second reactor 20 to be used in the third embodiment is not particularly limited to being in any form, and may be, for example, a fixed-bed adiabatic reactor, a fixed-bed adiabatic reactor that includes a recycling line, a heat exchange reactor, or the like.

Example According to Third Embodiment

The following describes an example in which the first reactor 10 employs the configuration of the reactor shown in FIG. 8, and the second reactor 20 (not shown) configured as a fixed-bed adiabatic reactor is provided downstream of the first reactor 10. Note that, in this example, the methanation reaction and the CO shift reaction had reached equilibrium in the first reactor 10, and oxygen reacts quantitatively and selectively with hydrogen in the second reactor 20.

In the following example, the reaction temperature of the heat exchange reactor 12d in the first reactor 10 was set to 250° C. In addition, the inlet temperature of the second reactor 20 was set to 200° C., so that the reaction proceeded under adiabatic conditions. The reaction pressure was set to 0.7 MPa in both the first reactor 10 and the second reactor 20. The hydrogen and carbon dioxide concentrations in the second fuel gas 4 obtained in this case are shown in FIGS. 15 and 16 with respect to the molar ratio of the hydrogen to the carbon dioxide in the mixed gas 1 supplied to the first reactor 10.

Figure 15:
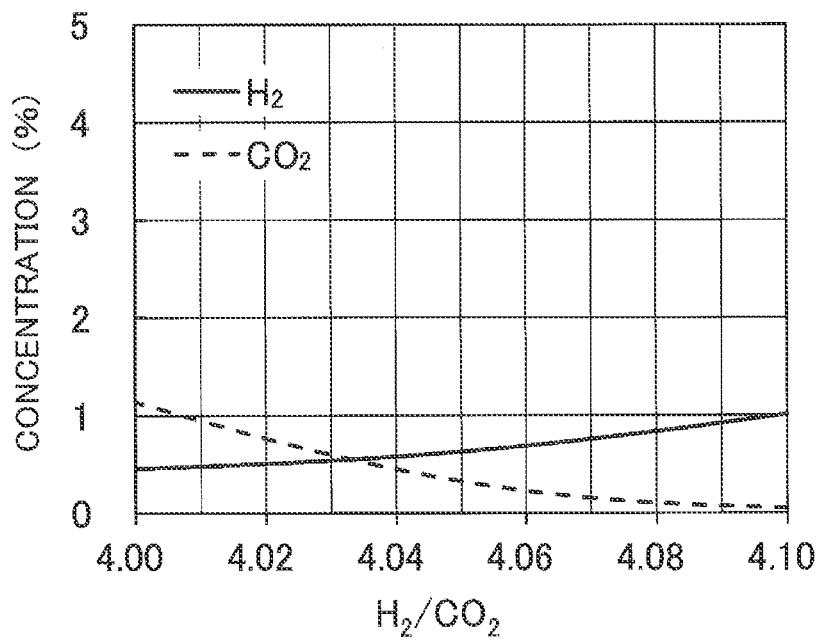
FIG. 15 is a diagram showing the effect of the ratio of the hydrogen to the carbon dioxide at the inlet, on the hydrogen and carbon dioxide concentrations in the equilibrium composition (after dehydration) of fuel gas obtained through a method for producing fuel gas according to the present invention (the molar ratio of the oxygen to the hydrogen is 0.45).

FIG. 15 shows a relationship between the composition of the mixed gas 1 and the hydrogen and carbon dioxide concentrations in the second fuel gas 4 when the amount of oxygen 3 added is 0.45 in terms of the molar ratio to the hydrogen contained in the first fuel gas 2. When the molar ratio of the hydrogen to the carbon dioxide in the mixed gas 1 is 4.0, the hydrogen concentration is 0.45% and the carbon dioxide concentration is 1.14%. When only the first step is carried out under the same conditions, the hydrogen concentration is 4.4% and the carbon dioxide concentration is 1.1% (FIG. 9). Therefore, it can be seen that the hydrogen concentration is significantly reduced in the second step. When the molar ratio of hydrogen to carbon dioxide is 4.04, the hydrogen concentration is 0.58%, the carbon dioxide concentration is 0.45%, and the methane concentration is 98.97%. As described above, it can be seen that both hydrogen and carbon dioxide concentrations are lowered, and high methane purity can be achieved.

In the second step, carbon dioxide cannot be reduced. If the molar ratio of the hydrogen to the carbon dioxide to be subjected to the first step is increased so as to be slightly higher than 4.0 so that the first step is carried out under conditions where hydrogen is slightly excessive, the carbon dioxide concentration in the first fuel gas 2 can be reduced through the first step. Here, as a result of adding an excessive amount of hydrogen, the hydrogen concentration in the first fuel gas 2 increases, but the hydrogen can be reduced in the second step. Therefore, a fuel gas with high methane purity can be obtained as described above, and the quality criterion that requires the hydrogen concentration to be 2% or less and the carbon dioxide concentration to be 0.5% or less, which cannot be achieved by the first step alone even under a high-pressure reaction condition at 5 MPa, can be achieved through a reaction at a low pressure of 0.7 MPa if the method according to the present embodiment is used. If the molar ratio of the hydrogen to the carbon dioxide in the mixed gas 1 to be subjected to the first step is further increased, the carbon dioxide concentration in the fuel gas that can be obtained can be further reduced. However, in addition to the fact that a larger amount of oxygen 3 is to be added, if the second step is carried out under adiabatic conditions, the outlet temperature of the second step becomes higher. As a result, another concern arises regarding an increase in the hydrogen and carbon dioxide concentrations due to the co-occurrence of the steam reforming reaction. From this viewpoint, it is preferable that the molar ratio of hydrogen to carbon dioxide to be subjected to the first step does not exceed 4.08. If the molar ratio of the hydrogen to the carbon dioxide is in the range of 4.04 to 4.08, it is easier to achieve the quality criterion that requires the hydrogen concentration to be 2% or less and the carbon dioxide concentration to be 0.5% or less. Note that when a carbon dioxide and a carbon monoxide are contained as carbon oxides, the ratio (molar ratio) of hydrogen to carbon oxide is likely to meet the above quality criterion if the value of {(hydrogen)+(carbon monoxide)}/{(carbon monoxide)+(carbon dioxide)} calculated based on the amount of substance falls within the range of 4.04 to 4.08.

Figure 16:
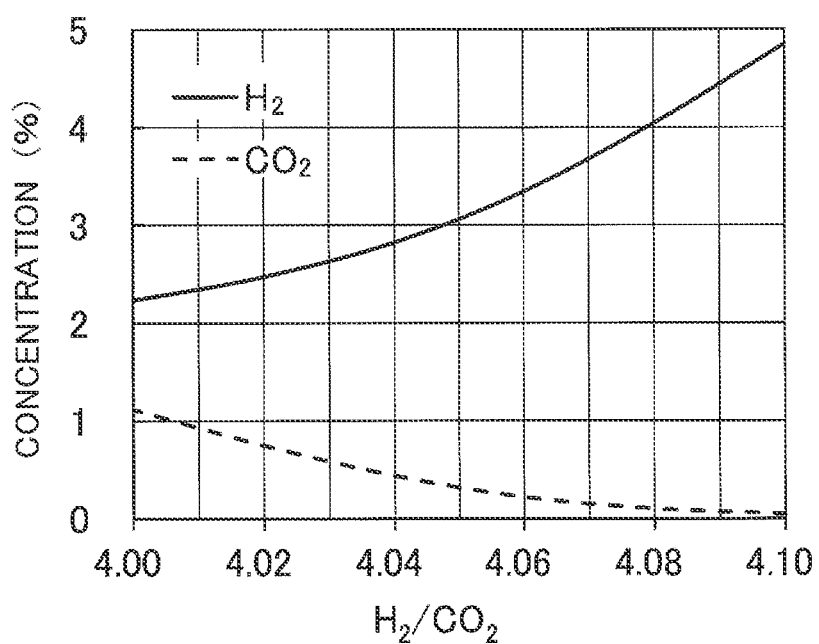
FIG. 16 is a diagram showing the effect of the ratio of the hydrogen to the carbon dioxide at the inlet, on the hydrogen and carbon dioxide concentrations in the equilibrium composition (after dehydration) of a fuel gas obtained through a method for producing fuel gas according to the present invention (the molar ratio of the oxygen to the hydrogen is 0.25).

FIG. 16 shows a relationship between the composition of the mixed gas 1 and the hydrogen and carbon dioxide concentrations in the second fuel gas 4 when the amount of oxygen 3 added is 0.25 in terms of the molar ratio to the hydrogen contained in the first fuel gas 2. In the example in FIG. 16, the amount of oxygen 3 added is smaller than in the example in FIG. 15, and therefore the hydrogen concentration in the second fuel gas 4 that can be obtained is higher than in FIG. 15. However, in comparison with FIG. 9, it can be understood that the hydrogen concentration in the second fuel gas 4 is reduced. If the molar ratio of the hydrogen to the carbon dioxide in the mixed gas 1 is in the range of 4.04 to 4.08, it is possible to achieve all of the quality criterions that require the hydrogen concentration to be 4% or less, the carbon dioxide concentration to be 0.5% or less, and components other than the hydrocarbons to be 4% or less. This condition cannot be achieved through the methanation reaction at 0.7 MPa, no matter what value the molar ratio of the hydrogen to the carbon dioxide in the mixed gas to be subjected to the methanation reaction is set to. Therefore, it is clear that the method according to the present invention is useful for producing a high-quality fuel gas without the use of a high-pressure reaction facility. Note that, even in this case, as in the above case, when carbon dioxide and carbon monoxide are contained as carbon oxides, the ratio (molar ratio) of hydrogen to carbon oxide is likely to meet the above quality criterion if the value of {(hydrogen)+(carbon monoxide)}/{(carbon monoxide)+(carbon dioxide)} calculated based on the amount of substance falls within the range of 4.04 to 4.08.

OTHER EMBODIMENTS

Finally, other embodiments of a fuel gas production method according to the present invention will be described. Note that the configurations disclosed in the following embodiments can be applied in combination with the configurations disclosed in other embodiments as long as no contradiction arises.

The above embodiments particularly describe examples in which the first reactor 10 used in the first step is configured as a combination of a fixed-bed adiabatic reactor that includes a recycling line, and a heat exchange reactor, as shown in FIG. 8. However, the reactor used in the first step according to the present invention is not particularly limited as long as a fuel gas that contains 2% to 10% hydrogen by volume can be obtained. Examples of such a reactor include a fixed-bed adiabatic multi-stage reactor, a single-stage or a multi-stage heat exchange reactor, and so on.

The above embodiment particularly describes an example in which the pressure in the first step is 0.7 MPa. However, the pressure in the first step according to the present invention is not particularly limited as long as a fuel gas that contains 2% to 10% hydrogen by volume can be obtained. However, when the pressure is 0.5 MPa or more, the hydrogen content and the carbon dioxide content in the first fuel gas obtained in the first step is reduced, so that the hydrogen content and the carbon dioxide content in the second fuel gas, which is the final product, are likely to be reduced as well. Also, in order to make it easier to reduce the cost of the facility for the first step, the pressure is preferably 3 MPa or less, and more preferably 1 MPa or less.

The above embodiment particularly describes an example in which the second reactor 20 used in the second step is configured as a fixed-bed adiabatic reactor. However, the reactor used in the second step according to the present invention is not particularly limited as long as the reactions represented by the formulas 4 to 7 proceed. Examples of such a reactor include a fixed-bed adiabatic reactor that includes a recycling line, a heat exchange reactor, and so on.

The above embodiment particularly describes an example in which the pressure in the second step is 0.7 MPa. However, the pressure in the second step according to the present invention is not particularly limited as long as the reactions represented by the formulas 4 to 7 proceed. However, if the pressure is 0.5 MPa or more, it is easier to reduce the hydrogen and carbon dioxide contents in the second fuel gas that can be obtained, without using a large amount of catalyst. Also, in order to make it easier to reduce the cost of the facility for the second step, the pressure is preferably 3 MPa or less, and more preferably 1 MPa or less.

The above embodiment particularly describes an example in which the pressure in the first step and the second step are the same (0.7 MPa). However, in the first step and the second step according to the present invention, the pressures may be the same or different.

In addition, the present invention does not exclude the combined use of conventionally known means for improving the methanation rate. For example, it is possible to employ a configuration for cooling the reaction gas in an intermediate stage of the multi-stage reaction to condense and separate some water vapor. Even in such a case, by using the method according to the present invention, it is possible to reduce the hydrogen and carbon dioxide concentrations in the fuel gas without removing water vapor to the extreme.

EXAMPLES

Hereinafter, the present invention will be more specifically described based on Examples and Comparative Examples, but the present invention is not limited to the following Examples.

Example 1

A silica support (FUJI SILYSIA CHEMICAL LTD., CARiACT G-6) was impregnated with a solution of silicotungstic acid ($SiO_2 \cdot 12WO_3 \cdot 26H_2O$) and palladium nitrate, evaporated and dried above a hot water bath, dried at 120° C., and calcined at 350° C. in air for 4 hours to prepare a catalyst (Pd/SiW/silica catalyst) in which 20% silicotungstic acid by weight and 2% palladium by weight are supported by 80% silica support by weight. In this catalyst, the silicotungstic acid supported on the silica support forms a solid acid, by which palladium is supported.

The aforementioned Pd/SiW/silica catalyst was compressed like a tablet, classified into 1.0 to 2.5 mm, and 6 mL of it was filled into a SUS reaction tube (inner diameter 16 mm). The tube was heated to 225° C. in an electric furnace while distributing a gas consisting of 2% hydrogen and residual nitrogen, was held for 2 hours to reduce the catalyst, and was thereafter further heated to and kept at 275° C.

400 mL per minute (volume under standard conditions of 0° C. and 101.325 kPa) of fuel gas consisting of 32.6% methane, 65.2% water vapor, 2.0% hydrogen, and 0.14% carbon dioxide was conditioned by adding ethanol thereto, so that the molar ratio of the ethanol to the hydrogen in the fuel gas was 0.46. The fuel gas to which ethanol was added was passed through the aforementioned catalyst under a condition where the pressure (absolute pressure) was 0.7 MPa.

The composition of 32.6% methane, 65.2% water vapor, 2.0% hydrogen, and 0.14% carbon dioxide corresponds to the equilibrium composition of a gas with a (hydrogen)/(carbon dioxide) value of 4.04 calculated on a mass basis, undergoing methanation at a temperature of 250° C. and a pressure of 0.7 MPa (absolute pressure), and simulates the fuel gas (the first fuel gas) that contains approximately 6% hydrogen by volume after dehydration, obtained in the first step (methanation process).

The fuel gas after the reaction was cooled and water was separated therefrom, and thereafter the concentrations of methane, ethane, hydrogen, carbon monoxide, and carbon dioxide were measured using a gas chromatograph.

The concentrations of the components (by volume after dehydration) in the fuel gas after the reaction were 3.1% hydrogen, 0.44% carbon dioxide, 0.09% carbon monoxide, 2.6% ethane, and residual methane.

Example 2

The same test as that carried out on Example 1 was carried out, except that the amount of ethanol added was changed so that the molar ratio of the ethanol to the hydrogen in the fuel gas was 0.79.

The concentrations of the components (by volume after dehydration) in the fuel gas after the reaction were 1.42% hydrogen, 0.45% carbon dioxide, 0.08% carbon monoxide, 4.5% ethane, and residual methane.

Comparative Example 1

The same test as that carried out on Example 1 was carried out, except that ethanol was not added.

The concentrations of the components (by volume after dehydration) in the fuel gas after the reaction were 5.7% hydrogen, 0.39% carbon dioxide, and residual methane. No carbon monoxide was detected.

Evaluation of Examples 1, 2 and Comparative Example 1

As indicated by Comparative Example 1, if ethanol is not added to the fuel gas containing hydrogen, substantially no reaction occurs when it is passed through the Pd/SiW/silica catalyst. On the other hand, as indicated by Example 1, if ethanol is added to the fuel gas containing hydrogen so that the molar ratio of the ethanol to the hydrogen is 0.46, and thereafter the fuel gas is passed through the Pd/SiW/silica catalyst, hydrogen reacts quantitatively with ethanol to form water vapor and ethane. The water vapor is removed by cooling the fuel gas and separating water therefrom. Therefore, the hydrogen concentration in the fuel gas is reduced, and ethane is generated. Under the conditions of Example 1, the hydrogen concentration is reduced to 3.1%. Therefore, the criterion that requires the hydrogen concentration to be 4% is satisfied. As indicated by Example 2, if ethanol is added to the fuel gas containing hydrogen so that the molar ratio of the ethanol to the hydrogen is 0.79, and thereafter the fuel gas is passed through the Pd/SiW/silica catalyst, the hydrogen concentration is reduced to 1.42%. Therefore, even the criterion of 2% hydrogen concentration can be satisfied.

Note that the carbon dioxide concentrations in the fuel gas after the reaction are 0.44%, 0.45%, and 0.39% in Examples 1 and 2 and Comparative Example 1, respectively. Also, in Examples 1 and 2, carbon monoxide that amounts to 0.08 to 0.09% was detected in the fuel gas after the reaction. It is envisaged that this is because the steam reforming reaction of ethanol proceeded slightly and some ethanol was converted into carbon monoxide, carbon dioxide, and hydrogen. However, most of the reacted ethanol was converted to ethane, and the carbon dioxide concentration was suppressed to 0.5% or less, and the carbon monoxide concentration was suppressed to 0.1% or less. Therefore, it can be said that there are no major problems in using the generated fuel gas as city gas.

Example 3

6 mL of a catalyst (N.E. CHEMCAT CORPORATION, AP2005) in which 0.5 mass % palladium was supported by an alumina support (3 mm pellet) was filled into a SUS reaction tube (inner diameter 10.7 mm) and was heated in an electric furnace, and was kept at 200° C.

400 mL per minute (volume under standard conditions of 0° C. and 101.325 kPa) of fuel gas consisting of 32.6% methane, 65.2% water vapor, 2.1% hydrogen, and 0.15% carbon dioxide was conditioned by adding oxygen thereto, so that the molar ratio of the oxygen to the hydrogen in the fuel gas was 0.24. The fuel gas to which oxygen was added was passed through the aforementioned catalyst under a condition where the pressure (absolute pressure) was 0.7 MPa.

The composition of 32.6% methane, 65.2% water vapor, 2.1% hydrogen, and 0.15% carbon dioxide corresponds to the equilibrium composition of a gas with a (hydrogen)/(carbon dioxide) value of 4.05 calculated on a mass basis, undergoing methanation at a temperature of 255° C. and a pressure of 0.7 MPa (absolute pressure), and simulates the fuel gas that contains approximately 6% hydrogen by volume after dehydration, obtained in the first step (methanation process).

The fuel gas after the reaction was cooled and water was separated therefrom, and thereafter the concentrations of methane, hydrogen, carbon monoxide, carbon dioxide, and oxygen were measured using a gas chromatograph.

The concentrations of the components (by volume after dehydration) in the fuel gas after the reaction were 3.2% hydrogen, 0.44% carbon dioxide, 0.01% oxygen, and residual methane. No carbon monoxide was detected.

Example 4

The same test as that carried out on Example 3 was carried out, except that the amount of ethanol added was changed so that the molar ratio of the oxygen to the hydrogen in the fuel gas was 0.45.

The concentrations of the components (by volume after dehydration) in the fuel gas after the reaction were 0.55% hydrogen, 0.46% carbon dioxide, 0.02% oxygen, and residual methane. No carbon monoxide was detected.

Comparative Example 2

The same test as that carried out on Example 3 was carried out, except that oxygen was not added.

The concentrations of the components (by volume after dehydration) in the fuel gas after the reaction were 6.1% hydrogen, 0.42% carbon dioxide, and residual methane. No carbon monoxide was detected.

Evaluation of Examples 3, 4 and Comparative Example 2

As indicated by Comparative Example 2, if oxygen is not added to the fuel gas containing hydrogen, substantially no reaction occurs when it is passed through the Pd/alumina catalyst. On the other hand, as indicated by Example 3, if oxygen is added to the fuel gas containing hydrogen so that the molar ratio of the oxygen to the hydrogen is 0.24, and thereafter the fuel gas is passed through the Pd/alumina catalyst, hydrogen reacts quantitatively with oxygen to form water vapor, which is removed by cooling the fuel gas and separating water therefrom. Therefore, the hydrogen concentration in the fuel gas is reduced. Under the conditions of Example 3, the hydrogen concentration is reduced to 3.2%. Therefore, the criterion that requires the hydrogen concentration to be 4% is satisfied. As indicated by Example 4, if oxygen is added to the fuel gas containing hydrogen so that the molar ratio of the oxygen to the hydrogen is 0.45, and thereafter the fuel gas is passed through the Pd/alumina catalyst, the hydrogen concentration is reduced to 0.55%. Therefore, even the criterion of 1% hydrogen concentration can be satisfied.

Note that the carbon dioxide concentrations in the fuel gas after the reaction are 0.44%, 0.46%, and 0.42% in Examples 3 and 4 and Comparative Example 2, respectively. As a result of adding oxygen and passing the fuel gas through the Pd/alumina catalyst, it appears that carbon dioxide increased. However, due to the decrease in hydrogen, the total amount of gas decreased, and the ratio of the carbon dioxide increased relatively, which is the main reason for the increase in carbon dioxide concentration.

INDUSTRIAL APPLICABILITY

The present invention can be used as a method for producing a fuel gas that is to be supplied as city gas, for example.

DESCRIPTION OF REFERENCE SIGNS

1: Mixed Gas
2: First Fuel Gas
3: Predetermined Reactant
4: Second Fuel Gas
10: First Reactor
11a-15a: Reactor
11b-15b: Heat Exchanger
11c: Recycling Line
12d: Heat Exchange Reactor
20: Second Reactor
30: Flow Control Valve

The invention claimed is:

1. A method for producing fuel gas comprising:
a first step of causing hydrogen and carbon oxide to react with each other in a presence of a first catalyst to obtain a first fuel gas that contains 2% to 10% hydrogen by volume after dehydration; and
a second step of consuming the hydrogen in the first fuel gas to obtain a second fuel gas with a reduced hydrogen concentration,
wherein the first catalyst contains a methanation catalyst,
the second step includes an exothermic reaction that generates heat of 60 kJ or more per mole of hydrogen,
the exothermic reaction is a reaction through which the hydrogen in the first fuel gas and a predetermined reactant are caused to react with each other in a presence of a second catalyst to generate water and a paraffin hydrocarbon with two to four carbon atoms,
the predetermined reactant comprises at least one alcohol selected from among alcohols that each have two to four carbon atoms, and
the second catalyst comprises a dehydration-hydrogenation catalyst that is active in a dehydration reaction of said at least one alcohol and a hydrogenation reaction of an olefin.

2. The method for producing fuel gas according to claim 1,
wherein a ratio of the hydrogen to the carbon oxide to be subjected to the first step has a value with which a value of {(hydrogen)+(carbon monoxide)}/{(carbon monoxide)+(carbon dioxide)} calculated based on an amount of substance (mol) falls within a range of 4.04 to 4.08, and
a molar ratio of the alcohol with two to four carbon atoms to the hydrogen in the first fuel gas to be subjected to the second step, obtained through the first step, is from 0.45 to 0.9.

3. The method for producing fuel gas according to claim 1,
wherein the second catalyst comprises a solid acid catalyst and at least either palladium or platinum, and
said at least either palladium or platinum is supported by the solid acid catalyst.

4. The method for producing fuel gas according to claim 1,
wherein the predetermined reactant is ethanol.

5. A method for producing fuel gas comprising:
a first step of causing hydrogen and carbon oxide to react with each other in a presence of a first catalyst to obtain a first fuel gas that contains 2% to 10% hydrogen by volume after dehydration; and a second step of consuming the hydrogen in the first fuel gas to obtain a second fuel gas with a reduced hydrogen concentration, wherein the first catalyst contains a methanation catalyst, the second step includes an exothermic reaction that generates heat of 60 kJ or more per mole of hydrogen, the exothermic reaction is a reaction through which the hydrogen in the first fuel gas and a predetermined reactant are caused to react with each other in a presence of a second catalyst to generate a paraffin hydrocarbon with two to four carbon atoms, the predetermined reactant comprises at least one olefin hydrocarbon selected from among olefin hydrocarbons that each have two to four carbon atoms, and the second catalyst includes a hydrogenation catalyst.

6. The method for producing fuel gas according to claim 5, wherein a ratio of the hydrogen to the carbon oxide to be subjected to the first step has a value with which a value of {(hydrogen)+(carbon monoxide)}/{(carbon monoxide)+(carbon dioxide)} calculated based on an amount of substance (mol) falls within a range of 4.04 to 4.08, and a molar ratio of the olefin hydrocarbon with two to four carbon atoms to the hydrogen in the first fuel gas to be subjected to the second step, obtained through the first step, is from 0.5 to 0.9.

7. The method for producing fuel gas according to claim 5, wherein the second catalyst comprises an inorganic oxide and at least either palladium or platinum, and said at least either palladium or platinum is supported by the inorganic oxide.

* * * * *